United States Patent
Find et al.

(10) Patent No.: US 10,730,007 B2
(45) Date of Patent: *Aug. 4, 2020

(54) METHOD FOR ENERGY EFFICIENT RECOVERY OF CARBON DIOXIDE FROM AN ABSORBENT AND A PLANT SUITABLE FOR OPERATING THE METHOD

(71) Applicant: Union Engineering A/S, Fredericia (DK)

(72) Inventors: Rasmus Find, Vejle (DK); Jan Flensted Poulsen, Vorbasse (DK)

(73) Assignee: UNION ENGINEERING A/S, Fredericia (DK)

( * ) Notice: Subject to any disclaimer, the term of this patent is extended or adjusted under 35 U.S.C. 154(b) by 57 days.

This patent is subject to a terminal disclaimer.

(21) Appl. No.: 15/535,392

(22) PCT Filed: Dec. 10, 2015

(86) PCT No.: PCT/DK2015/050388
§ 371 (c)(1),
(2) Date: Jun. 12, 2017

(87) PCT Pub. No.: WO2016/091266
PCT Pub. Date: Jun. 16, 2016

(65) Prior Publication Data
US 2017/0361266 A1    Dec. 21, 2017

(30) Foreign Application Priority Data
Dec. 11, 2014    (EP) .................................. 14197388

(51) Int. Cl.
*B01D 53/14*        (2006.01)
*B01D 3/42*         (2006.01)

(52) U.S. Cl.
CPC ..... *B01D 53/1475* (2013.01); *B01D 53/1425* (2013.01); *B01D 2257/504* (2013.01); *B01D 2259/65* (2013.01); *Y02C 10/06* (2013.01)

(58) Field of Classification Search
None
See application file for complete search history.

(56) References Cited

U.S. PATENT DOCUMENTS

| | | | |
|---|---|---|---|
| 2004/0118126 | A1 | 6/2004 | Ong et al. |
| 2012/0006197 | A1 | 1/2012 | Find |

(Continued)

FOREIGN PATENT DOCUMENTS

| | | |
|---|---|---|
| CN | 101385937 A | 3/2009 |
| CN | 102300621 A | 12/2011 |

(Continued)

OTHER PUBLICATIONS

International Search Report for PCT/DK2015/050388; dated Feb. 23, 2016; 3 pages.

(Continued)

*Primary Examiner* — Philip Y Louie
(74) *Attorney, Agent, or Firm* — Husch Blackwell LLP

(57) ABSTRACT

The present invention relates to a method for recovering acid gas from an absorbent rich on gaseous acid gas, in which the energy used for separation of absorbent and acid in a stripping column is reduced by recycling heat transfer fluid from the stripper off gas in an energy efficient manner. The invention further relates to a plant suitable for carrying out said method.

24 Claims, 9 Drawing Sheets

(56) References Cited

U.S. PATENT DOCUMENTS

2013/0055756 A1    3/2013    Tsutsumi et al.
2014/0190351 A1    7/2014    Reddy et al.
2014/0322118 A1*  10/2014   Vera-Castaneda .......................... B01D 53/1406
                                                                                423/243.11

FOREIGN PATENT DOCUMENTS

CN        103463934 A    12/2013
EP          2644250 A1    10/2013
WO     2008063082 A2    5/2008

OTHER PUBLICATIONS

Office Action and Search Report, related Chinese Application No. 201580074098.8, dated Dec. 23, 2019, 14 pages.

* cited by examiner

METHOD FOR ENERGY EFFICIENT RECOVERY OF CARBON DIOXIDE FROM AN ABSORBENT AND A PLANT SUITABLE FOR OPERATING THE METHOD

The present invention relates to a method for recovering carbon dioxide from an absorbent rich on gaseous carbon dioxide, in which the energy used for separation of absorbent and carbon dioxide in a stripping column is reduced, the invention further relates to a plant for carrying out said method.

BACKGROUND OF THE INVENTION

Carbon dioxide recovery plants are widely used to clean and/or recover carbon dioxide released e.g. from combustion of hydrocarbons, fermentation and gas processing. The recovered carbon dioxide can optionally be liquefied and sold as an end-product or utilized in the production of a given plant.

In a typical absorber-regenerator system, recovery of carbon dioxide is performed by introduction of the gas in an absorber, where the gas contacts a lean solvent containing an absorbent flowing down the absorber. The carbon dioxide is at least partially absorbed by the lean solvent and the depleted gas leaves the absorber for further processing or discharge. The solvent containing the carbon dioxide is then treated to release the carbon dioxide for example by stripping, and the carbon dioxide may be recovered or further purified. Conventional technologies available for recovering the absorbent and carbon dioxide, respectively, include stripping. The absorber-regeneration system typically allows continuous operation for recovery of carbon dioxide.

In designing processes and determining parameters resulting in the required high purity carbon dioxide and at the same time at the highest rate of product yield, the further downstream purification steps often comprise open and closed loop systems, wherein the lean streams of absorbent, which may still contain remnants of carbon dioxide, are further processed and recycled to extract even more carbon dioxide from the absorbent. Implementing such loop systems thereby facilitates the recovery and reuse of streams, such as absorbent and/or water, in order to reduce costs and waste.

However, the further processing for regeneration of absorbent or extracting more carbon dioxide from the absorbent also requires additional energy, such as for cooling, heating and pressurising. In general, the energy consumption required per unit yield, increases with the purity of the absorbent. That is the energy consumption required for recovering the last remnants of carbon dioxide from a lean stream of absorbent is higher per unit yield as compared to the recovery of the first units of e.g. a carbon dioxide-rich absorbent stream.

Several plants for the recovery of carbon dioxide improving on the overall energy efficiency have been described. US 2013/0055756 describes one such recovery plant, wherein lean absorbent from the regenerator tower is recirculated to the top of the regenerator tower using conventional reboiling, and the mixed stripper off gas is compressed and condensed to recirculate solvent to the regenerator tower for further recovery. An intermediate condensing heat exchanging step is included where the lean absorbent and the mixed gas are heat exchanged. The energy efficiency however is in the heat pump system, 6, located in and in between the absorption tower and the regeneration tower.

WO 2008/063082 also describes a method for regeneration of absorbed carbon dioxide, wherein heat energy is recovered from the carbon dioxide gas. An absorbed carbon dioxide stream is subjected to a stripping procedure thereby creating a heated gaseous carbon dioxide-rich stream and a liquid carbon dioxide-lean absorbent stream. The heated gaseous carbon dioxide-rich stream is subjected to a number of compression steps with intermittent addition of heat transfer fluid, and heat is recovered from the compressed gas using a heat exchanger. The recovered energy may be used for heating the liquid carbon dioxide-lean absorbent stream in a regeneration reboiler, as the heat of the regenerator reboiler or part of the heat of the regenerator reboiler.

Thus, energy is recovered from the compressed heated carbon dioxide and this heat may be used to reboil a fraction of the lean absorbent in order to decrease the overall energy consumption of the carbon dioxide recovery process.

In US 2014/0190351 a process is described for reducing energy consumption of a carbon dioxide recovery process, more specifically to reduce the energy used in the stripping process by utilizing heat energy produced in the system for the stripper reboiler. This is solved by providing low pressure steam to the stripper reboiler for providing the stripping steam without degrading the solvent (absorbent). Condensate from the saturated stripper gas may be led to the stripper reboiler as well for evaporation and use as stripping steam and thus reduce the need for supplying mark up water.

In large facilities, even a minute decrease in the energy consumption per unit of carbon dioxide yield is of great economical benefit. Therefore, there is an ongoing need for designing processes and parameters resulting in the recovery of carbon dioxide at lower energy expenditure. In addition to energy expenditure there is an equally important economic aspect in reducing other resources consumed per unit carbon dioxide yield, such as the amount of absorbent and/or water required in the process.

Also, minimizing input to the process such as supplying water, absorbent etc. is also an ongoing desire.

Hence, it is an object of the present invention to further reduce overall energy consumption of carbon dioxide recovery processes as well as reducing the consumption of additional resources such as water.

SUMMARY OF THE INVENTION

The above mentioned object is achieved by the aspects of the present invention, wherein a first aspect relates to a method for recovering carbon dioxide from a liquid carbon dioxide-rich absorbent (L1) comprising the steps of:

a. Providing the liquid acid gas-rich absorbent stream (L1) having absorbed acid gas therein,
b. separating carbon dioxide from the acid gas-rich absorbent stream (L1) in a stripping column (A2) using a gaseous stripping medium (G2) in order to provide a acid gas-containing gas stream (G1) and a liquid acid gas-lean absorbent stream (L2),
c. transferring heat from the acid gas-containing gas stream (G1) to a stream of heat transfer fluid (L4) in order to provide a cooled acid gas-containing stream (G3) and a heated stream (L4');
d. separating the heated stream (L4') into a recovered gaseous stripping medium (G4) and a liquid heat carrier (L5), and
e. providing the recovered stripping medium (G4) directly or indirectly to the stripping column (A2).

By this method stripping steam recovered from the stripper off gas is supplied to cover at least part of the same stripping process, thereby externally supplied heat is reduced. This provides an overall energy reduction, where external energy is replaced with steam energy generated from heat exchange of the stripper off gas and a heat transfer fluid. In a particular embodiment the acid gas is carbon dioxide.

In a preferred embodiment of the present invention, a liquid heat carrier (L5) is used as at least part of the heat transfer fluid (L4), thereby facilitating a further recovery of liquid to be used as heat transfer fluid by providing a loop of water/steam. In addition the heat carrier is maintained in the loop of stripping and hence in addition to the reduction in the heat supply, there is a minimized need for supplying additional heat carrier (and ultimately stripping medium) to the system.

In one embodiment, the absorbent is aqueous, e.g. the absorbent is an aqueous solution of an absorbent. Preferably an a sterically hindered amine, such as AMP, alkanolamine such as an alkanolamine having 1 to 3 alkanol radicals, each alkanol radical having 1, 2 or 3 carbon atoms, and water. Examples of suitable alkanolamines are monoethanolamine (MEA), diethanolamine (DEA), and triethanolamine (TEA), MEA being the absorbent of choice since it is well tested cheap and proven effective.

With the method according to the present invention it has proven possible to reduce the amount of energy required in this open loop for the acid gas recovery as well as saving water.

That is, acid gas, e.g. carbon dioxide, from the feed stream and remaining acid gas in the lean absorbent is recovered partially by using vapour originating from the stripper process. This saves energy, since less lean absorbent has to be reboiled to provide sufficient stripping medium. Also, water from the stripping medium originating from the aqueous absorbent is recirculated and reused. Thus, both water and energy required for providing the heat transfer fluid at the right temperature, which is well above ambient, may be reduced.

In terms of the present invention, water and remaining acid gas in the lean absorbent stream (L2) is reboiled by heating and is returned to the stripping column (A2).

The energy for heating of the liquid acid gas-lean absorbent stream (L2) to provide a gas/liquid heated acid gas-lean absorbent stream (L2') is provided by external heating.

Accordingly, in one embodiment the method further comprises the steps of f. Heating the liquid acid gas lean absorbent stream (L2) to provide a gas/liquid heated acid gas lean absorbent stream (L2');

g. Separating the gas/liquid heated acid gas lean absorbent (L2') in a second separator (A7) to provide an evaporated stripping medium (G2') and recovered liquid absorbent stream L3.

The recovered liquid absorbent is preferably circulated to the absorber in a customary manner.

In a preferred embodiment, the temperature of the recovered stripping medium (G4) is higher than the temperature of the gas/liquid heated acid gas lean absorbent (L2'), and in a further embodiment, the temperature of the mixture of heated acid gas-lean absorbent stream (L2') and the recovered stripping medium (G4) is in the range of 100° C. to 130° C., preferably in the range of 105° C. to 120° C., more preferably in the range of 110° C. to 115° C.

The method according to the present invention thereby facilitates the use of an alternative source of thermal energy for providing stripping medium. The source of the thermal energy for the stripping is provided by the recovered stripping medium (G4) originating from the stripping procedure itself, since it is recovered from the thermal energy of the acid gas-containing gas stream (G1) from the stripping procedure.

Accordingly, the method of the present invention facilitates an energy efficient way to recover acid gas from a liquid acid gas containing absorbent.

In a particular embodiment the recovered stripping medium (G4), optionally compressed i.e. as described immediately below, is fed to the stripping column (A2) at a position below the feeding position of the gaseous stripping medium (G2). The feeding of the recovered stripping medium (G4) or the compressed recovered stripping medium (G4') at a position below provides a better recovery of carbon dioxide from the absorbent in the stripping column (A2) since the gaseous stripping medium is richer in carbon dioxide than the recovered resp. compressed recovered stripping medium (G4 and G4').

In a preferred embodiment the recovered stripping medium (G4) prior to being provided to the stripping column (A2) is compressed to provide a compressed recovered stripping medium (G4'). This ensures a smooth circulation of the compressed recovered stripping medium (G4') into the separator or into the stripping column without the need for further equipment. Hence, in addition to utilisation of the heating capacity the recirculation of the stripping medium is easily facilitated by the pressure difference. It is contemplated that the pressure of the recovered stripping medium (G4) may have a pressure which is lower than, equal to or higher than the pressure operated in the stripping column (A2).

The temperature of the compressed recovered stripping medium (G4') may be higher than the temperature of the gas/liquid heated acid gas lean absorbent (L2'). Since the two streams in a particular embodiment are mixed the heat from the recovered stripping medium (G4) will enhance evaporation of the stripping medium from the combined streams. This in turn reduces the temperature to which the lean absorbent stream (L2) must be heated beforehand. Furthermore, the recovered stripping medium (G4) preferably has a pressure which is higher than or equal to the operating pressure of the separation by stripping in step b.

Thus, in an embodiment, the stripping medium (G2) is the evaporated stripping medium (G2'), the compressed stripping medium (G4') or both.

In an embodiment thereof the compressed stripping medium (G4') and the evaporated stripping medium (G2') are mixed prior to being fed to the stripping column (A2).

Accordingly, throughout the description and claims the streams referred to as recovered stripping medium (G4) and compressed recovered stripping medium (G4') may be used interchangeably and notes whether compression of the recovered stripping medium (G4) is applied.

The person skilled in the art will appreciate that certain temperature and pressure conditions must be maintained in the separation step to provide a workable stream returning to the stripping procedure. Accordingly, the stripping medium (G2) returning from the separation step should have a minimum temperature of about 100° C., preferably in the range of from about 105° C. to 120° C., more preferably from about 110° C. to 115° C., at about 1.4 bar.

In an embodiment the mass flow ratio between the stripping medium (G2) and compressed recovered stripping medium (G4') in the step of mixing is in the range of 4:1 to 1:1, preferably in the range of about 3.5:1 to 2.5:1, such as 3:1, with the proviso that the temperature of the two streams when admixed together is above 100° C., preferably above 105° C., more preferably above 110° C. or in the range of 105° C. to 115° C., 110° C. to 115° C. However, mixing in other ranges will also be beneficial such as down to 5, 10 or 15% recycle (G4') of the total stripping steam. It is also contemplated that pressure and temperature may be higher, such as temperatures up to 140° C. and corresponding pressure for a saturated steam.

Accordingly, the recirculation of the recovered stripping medium, (G4), replaces external energy supplied to A6, which would otherwise be required to heat up the liquid acid gas-lean absorbent stream (L2) to provide sufficient stripping medium. In an embodiment, the recovered stripping medium (G4) replaces external energy with thermal energy in an amount of more than 200 kW, preferably more than 300 kW as illustrated in the example.

According to the present invention the transfer of heat from the acid gas-containing gas stream (G1) to a stream of heat transfer fluid (L4) is facilitated by a heat exchanger. In a particular embodiment the heat transfer in step c. is provided by bringing the heat transfer fluid (L4) in direct contact with the acid gas-containing gas stream (G1) to obtain the heated stream (L4'), and a cooled acid gas-containing gas stream (G3). Direct contact of the two streams increases the utilisation of the heat contained in the acid gas containing gas stream (G1), since no heat is absorbed in surfaces of equipment facilitating the exchange. Thus, a direct contact cooler is a preferred unit for the heat transfer in step c. Accordingly, the heat transfer is performed so that the temperature of the heated stream (L4') is approximately equal to the temperature of the acid gas containing gas stream (G1), and the temperature of the cooled acid gas-containing stream (G3) is approximately equal to the temperature of the heat transfer fluid (L4). Complete transfer of the heat—depending on the temperature difference—can be obtained by adjusting the height of the direct contact cooler and/or the flow ratio of the respective streams. In general, the skilled person will be able to determine a suitable height and diameter of a cooler given flow and temperatures and/or the flows given the height and the temperatures.

In a specific embodiment where the acid gas is carbon dioxide and the flow rate of the carbon dioxide containing gas stream (G1) is 2400 kg/h, the temperature is 102° C., the flow rate of the heat transfer fluid (L4) is 22000 kg/h and the temperature of the heat transfer fluid is 70° C., the height of the heat transfer of the direct contact cooler is approx. 4 m and the diameter is approx. 0.7 m when the packing material is pall rings (random packed). This will provide a complete transfer of heat from the carbon dioxide containing gas stream to heat transfer fluid providing a cooled carbon dioxide-containing stream (G3) having a temperature of approx. 70° C. and a heated stream (L4') having a temperature of approx. 102° C.

In the prior art methods the heat is typically recovered using indirect heat exchange, i.e. where the fluids are maintained separate in order to prevent mixing. When using direct contact cooling, the heat transfer may result in the heated stream (L4') containing remnants of dissolved acid gas therein.

However, by cooling with direct contact it is possible to achieve a more efficient recovery of the heat present in the acid gas-containing gas stream (G1). Furthermore, the heated stream (L4') may readily be admixed with the gas/liquid heated acid gas-lean absorbent stream (L2'). Accordingly, a major part of the water present in the acid gas-containing gas stream (G1) leaving the stripper is returned to the stripper. Consequently, the overall consumption of water in the acid gas recovery process is reduced, since the water which is used in its vapour form as stripping medium is recycled in a very efficient manner. Hence, only minor add up of water is necessary, i.e. less than 1% (based on weight) of the feed flow rate. Furthermore, dissolution of remnants of acid gas in the heat transfer fluid (L4) resulting from the direct contact heat transfer does not infer an overall loss of acid gas. The dissolved acid gas in the recovered stripping medium (G4) is readily recovered in the stripping procedure as the compressed recovered stripping medium (G4') is admixed directly or indirectly with the stripping medium (G2). Also, when using direct cooling, the pressure drop in the unit will be lower than when using indirect cooling and hence the pressure of G3 will be higher, and the final product G5 will ultimately need less pressurisation to provide it in a suitable form for further processing.

In an embodiment pertaining to the use of a direct contact heat exchange, the acid gas containing stream (G1) is compressed to a compressed acid gas containing stream (G1') before the heat transfer step c.

In a further embodiment when applying direct heat exchange the separation of step d. is provided by the steps of:
d.i. depressurising the heated stream (L4') to provide a depressurised stream (L4"); and
d.ii. separating the depressurised stream (L4") by flashing in a first flashing column (A9) to provide the recovered stripping medium (G4) and the liquid heat carrier (L5).

In a yet further embodiment, the separation of step d.ii. prior to providing the heat transfer fluid (L5) provides a liquid stream (L4''') which is subjected to the steps of:
d.i. further depressurising the liquid stream (L4''') to provide a second depressurised stream (L4"") having a pressure which is lower than the pressure of the liquid stream (L4'''),
d.ii. separating the second depressurised stream (L4"") in a third separating unit (A10) to provide a second gas (a) and the liquid heat carrier (L5);
d.iii. re-compressing the second gas (a) to provide a re-compressed second gas (b); and
d.iv. feeding the re-compressed second gas (b) to the first flashing column (A9) where it leaves the flashing separation unit as part of the recovered stripping medium (G4).

By the steps provided the method of the invention provides a means for providing as much stripping medium as possible at a minimum input of energy. Furthermore, by circulating water in the system in direct contact with the streams to be treated, the supply of both make up water and energy otherwise needed to reboil the acid gas lean absorbent (L2), is minimized.

In a specific embodiment all the steps d.i. to d.vi. are repeated, preferably 2, 3 or 4 times. In such an embodiment, the repetitions may be in series and/or parallel. Including more repetitions of the steps d.i. to d.v. will increase the amount of vapour further.

In another embodiment the heat transfer in step c. is provided by indirect heat exchange, and wherein prior to the heat transfer, the heat transfer fluid (L4) is depressurised to a pressure which is lower than the pressure of the liquid heat carrier (L5).

Depressurising prior to heat exchanging has two advantages. First of all it allows for a better heat transfer so that the cooled acid gas-containing stream (G3) is cooler and hence the heated stream (L4') is warmer as compared to depressurising after heat exchange. Secondly, it allows for the heat recovery unit (A3) being an indirect heat exchanger and the flash separation unit (A9) to be integrated in one unit. Hence, saving space and installations costs.

It follows that in a specific embodiment of applying indirect heat exchange the separation of step d. is provided by the steps of:

d.i. separating the heated stream (L4') by flashing in a first flashing column (A9) to provide the recovered stripping medium (G4) and a liquid stream (L4''');

d.ii. further depressurising the liquid stream (L4''') to provide a second depressurised stream (L4'''') having a pressure which is lower than the pressure of the liquid stream (L4'''), d.iii. separating the second depressurised stream (L4'''') in a third separating unit (A10) to provide a second gas (a) and the liquid heat carrier (L5);

d.iv. re-compressing the second gas (a) to provide a re-compressed second gas (b); and d.v. feeding the re-compressed second gas (b) to the first flashing column (A9) where it leaves the flashing separation unit as part of the recovered stripping medium (G4).

According to this specific embodiment a further embodiment may feature, that all the steps d.i. to d.v. are repeated, preferably 2, 3 or 4 times. In such an embodiment, the repetitions may be in series and/or parallel. Including more repetitions of the steps d.i. to d.v. will increase the amount of vapour further.

Applying an indirect heat exchange will provide a more clean stripper medium since there will be little acid gas dissolved therein and close to none. Hence, in this embodiment the complete heat transfer is exchanged for a more acid gas deficient stripping medium and hence ultimately a more acid gas lean absorbent to be recirculated to the absorption column.

All the following features and variants relate to the common steps and may apply equally to all embodiments, i.e. irrespective of direct and indirect heat transfer. Accordingly, in an embodiment anyone or more of L4', L4'', L4''', L4'''', preferably L4'' and/or L4'''', are heated by a heat source, preferably a low value heat source. Supplying additional heat to any of these streams will provide an increased vapour pressure of that particular stream and thus result in an increased mass flow of G4. The heat may be taken from any suitable place of the process itself or from an external heat source. The skilled person will know when excess heat is present in any given system.

An embodiment of the present invention comprises a step of optionally cooling the cooled acid gas-containing stream (G3) and separating the optionally cooled stream in an acid gas product stream (G5) and a second liquid stream (L6), and optionally recirculating the second liquid stream (L6) to the stripping column (A2).

In yet a variation of the method of the invention the liquid acid gas-lean absorbent stream (L2) is heated in a third heat exchanger (A6) and separated to provide the gaseous stripping medium (G2) and a recovered liquid absorbent stream (L3) and wherein the heat transfer fluid (L4) of step c is the recovered liquid absorbent stream (L3) and wherein the heat recovery unit (A3) for the heat transfer is an indirect heat exchanger (A3).

In this way the heat transfer fluid is the lean absorbent. With this embodiment the heat will be transferred at a reduced installation cost.

In a particular embodiment of this variation the recovered liquid absorbent stream (L3) is depressurised in a fourth depressurising unit (A18) to provide a depressurised recovered liquid absorbent stream (L3'), the pressure reducing unit may be a pressure reducing valve or a flow control valve. This stream is heated in the heat recovery unit (A3) to provide a heated recovered liquid absorbent stream (L3'') and further it is contemplated that the heated recovered liquid absorbent stream (L3'') is separated in a fourth separator (A19) to provide an absorbent and the recovered stripping medium (G4) which may be pressurised in the second pressure increasing unit (A12) to provide the compressed recovered stripping medium (G4'), which is being provided to the stripping column (A2).

In another aspect the present invention relates to a plant for removal of acid gas from a feed gas, said plant comprising a stripping column (A2) having a gas inlet through which a stripping medium is fed and a liquid inlet through which a liquid acid gas rich absorbing agent is fed, said stripping column (A2) being provided with a gas outlet and a liquid outlet, said gas outlet being connected to a heat recovery unit (A3) additionally having a heat transfer fluid inlet, a product gas outlet and a second liquid outlet, said second liquid outlet being connected directly or indirectly to the stripping column (A2). In a further embodiment, the second liquid outlet of the heat recovery unit (A3) is connected to a first pressure reducing unit (A8), which is then directly or indirectly connected to the stripping column (A3).

In an embodiment the plant comprises a second separator (A7), wherein the separator (A7) has a liquid inlet connected, through a third heat exchanger (A6), to the liquid outlet of the stripping column (A2), and said separator (A7) further having a liquid outlet and a gas outlet, said gas outlet being connected directly or indirectly to the gas inlet of the stripping column (A2).

In a further embodiment the first pressure reducing unit (A8) is connected to a flash separation unit (A9), said flash separation unit (A9) additionally having a gas inlet, a liquid outlet and a gas outlet, said gas outlet being connected directly or indirectly to the stripping column (A2), and said liquid outlet being directly or indirectly connected to the heat recovery unit (A3).

In an embodiment the flash separation unit (A9) is connected to a second pressure increasing unit (A12), which is connected directly or indirectly to the stripping column (A2).

In a further embodiment, the liquid outlet of the flash separation unit (A9) is indirectly connected to the heat recovery unit (A3) by the liquid outlet being connected to a second pressure reducing unit (A13), said second pressure reducing unit (A13) being connected directly or indirectly with the liquid inlet of the heat transfer fluid inlet of the heat recovery unit (A3).

In an embodiment the second pressure reducing unit (A13) is connected to a third separator (A10) further having a gas outlet and a liquid outlet, said gas outlet being connected to a first pressure increasing unit (A11), which is connected to the gas inlet of the flash separation unit (A9), and wherein the liquid outlet of the second separator is connected, optionally through a pump and/or to a mixer unit (A14) with the liquid inlet of the heat transfer fluid inlet of the heat recovery unit (A3).

Hence, in a preferred embodiment of the present invention the first pressure reducing unit (A8) is indirectly connected to the stripping column (A2) and wherein the first pressure reducing unit (A8) is connected to a flash separation unit (A9), said flash separation unit (A9) additionally having a gas inlet, a liquid outlet and a gas outlet, said gas outlet being connected to a second pressure increasing unit (A12) which is connected to the stripping column (A2), the liquid outlet is connected to a second pressure reducing unit (A13), which is connected to a third separator (A10) further having a gas outlet and a liquid outlet, the gas outlet is connected to a first pressure increasing unit (A11) which is connected to the gas inlet of the flash separation unit (A9), and wherein the liquid outlet of the third separator (A10) is connected, optionally through a pump and/or a mixer unit (A14), with the liquid inlet of the heat transfer fluid inlet of the heat recovery unit (A3).

In another embodiment the heat recovery unit (A3) is a direct contact heat exchanger.

It is contemplated that one or both of the pressure reducing units (A8) and (A12) is a pressure reducing valve and/or that one or both of the pressure increasing units (A11 and A12) is a vacuum pump (compressor).

In an embodiment the liquid outlet of the heat recovery unit (A3) is indirectly connected to the second separator (A7) in such a way that the connection of the liquid outlet of the heat recovery unit (A3) is in fluid connection with the stripping column (A2) via the second separator (A7).

The plant is designed for operating the method of the invention.

FIGURES

Examples of embodiments according to the present invention are in the following described in more detail with reference to the schematic drawings, in which FIG. 1 illustrates the method and plant for the recovery of acid gas according to the invention in one of its most simple aspect when applying direct contact heat exchange.

STREAMS AND INFLUENTS/EFFLUENTS

Figure 1:
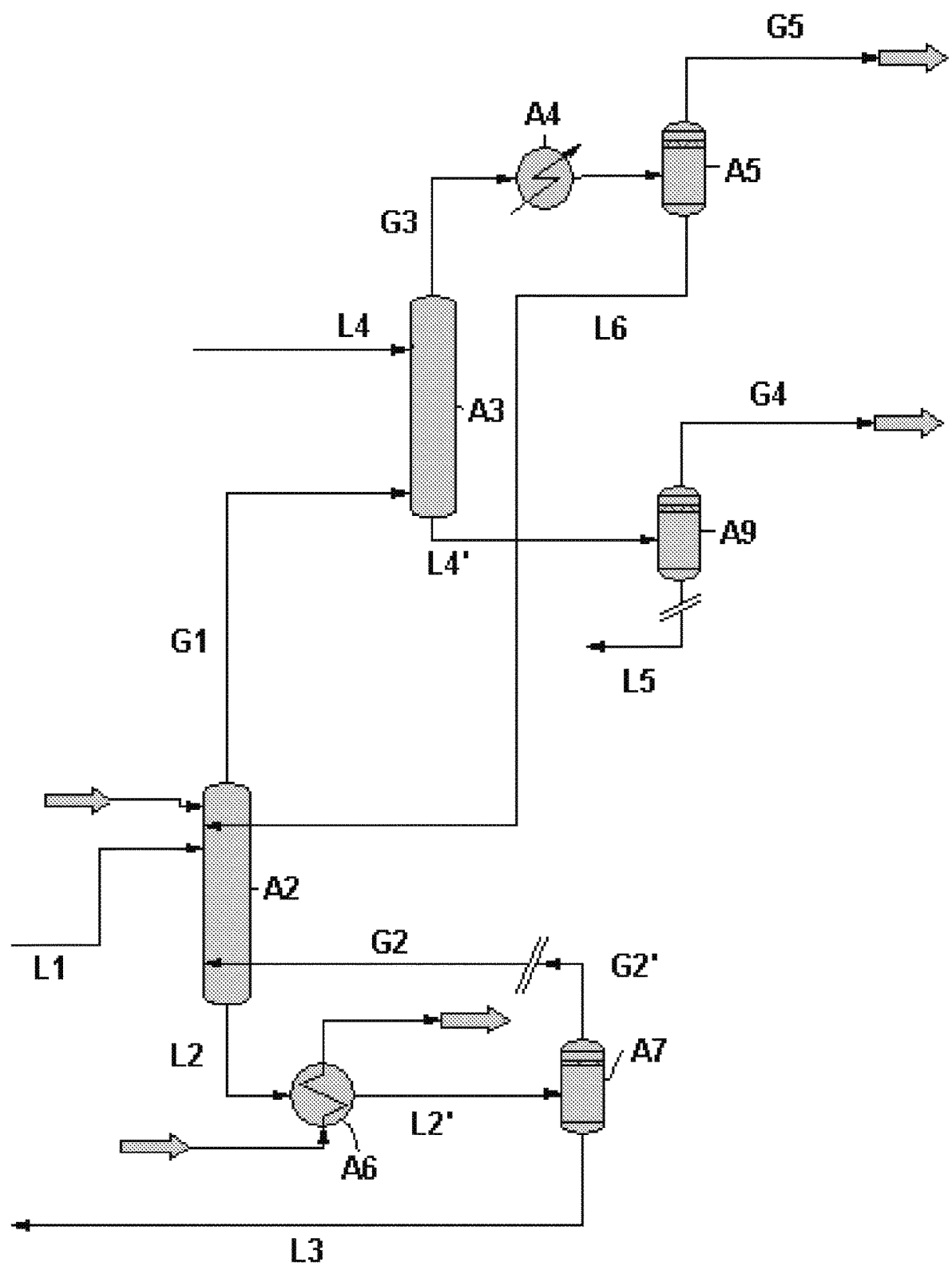

Throughout the description and claims streams and influents/effluents are denoted by the following: temperate liquid acid gas/carbon dioxide-rich absorbent L0; liquid acid gas/carbon dioxide-rich absorbent L1; liquid acid gas/carbon dioxide-lean absorbent stream L2; gas/liquid heated acid gas/carbon dioxide-lean absorbent L2'; recovered liquid absorbent stream L3; depressurised recovered liquid absorbent stream L3'; heated recovered liquid absorbent stream, L3''; heat transfer fluid L4; heated stream L4'; depressurised stream L4''; liquid stream L4'''; second depressurised stream L4''''; liquid heat carrier L5; second liquid stream L6; acid gas/carbon dioxide-containing gas stream G1; compressed acid gas/carbon dioxide-containing gas stream G1'; stripping medium G2; evaporated stripping medium G2'; cooled acid gas/carbon dioxide-containing stream G3; recovered stripping medium G4; compressed recovered stripping medium G4'; acid gas/carbon dioxide product stream G5, second gas a; compressed second gas b.

Components

Throughout the description and claims the components of the plant are denoted by the following: First heat exchanger A1; stripping column A2; heat recovery unit A3; second heat exchanger A4; first separator A5; third heat exchanger A6; second separator A7; first pressure reducing unit A8; flash separation unit A9; third separator A10; first pressure increasing unit A11; second pressure increasing unit A12; second pressure reducing unit A13; mixer unit A14; third pressure increasing unit A15; unit(s) A16; third pressure reducing unit A17; fourth pressure reducing unit A18, fourth separator A19.

DETAILED DESCRIPTION OF THE INVENTION

The illustrations appended to the present description should be understood as a section of a larger facility. All features and variants of each of the embodiments described herein apply equally to all embodiments. Accordingly, features detailed in respect of the method may apply equally to the plant and vice versa. For simplicity, accessory equipment is not included in the figure. However, a person skilled in the art will readily appreciate the type and positions for such equipment. As examples of accessory equipment can be mentioned liquid pumps, valves, condensers for condensation of water and/or chemical absorbent from the discharged gases, means for replenishing water and/or absorbent etc. In the following detailed description the invention will be described with reference to carbon dioxide as an example of the acid gas. The invention should not be limited thereto and all embodiments apply equally to acid gases in general such as $CO_2$, $H_2S$, $SO_2$ etc.

Throughout the description and claims the terms "rich", "lean", and "depleted" refers to the amount of e.g. carbon dioxide or absorbent contained in a specific stream, and the denotation may be used to distinguish between different streams resulting from the various separation steps and should be construed as being relative to each other in a particular separation step.

Referring now to FIG. 1 the method according to the first aspect of the invention is illustrated in one of its most general forms, in the below, the absorbent is described as being an aqueous solution, but the invention should not be limited thereto.

The schematic illustration should be construed as a downstream section following absorption of carbon dioxide from a gas source in an absorption column. Absorption of carbon dioxide is well known in the art. The method for recovering carbon dioxide from a carbon dioxide-rich absorbent comprises the steps of providing a liquid carbon dioxide-rich absorbent stream, L1, having absorbed gaseous carbon dioxide.

The carbon dioxide absorbed in the liquid carbon dioxide-rich absorbent, L1, may originate from any kind of carbon dioxide source. The source of carbon dioxide may originate e.g. from the combustion of fossil fuels, flue gases, from production of synthetic gases or from a production line for filling carbonated beverages. Preferred is a flue gas.

The absorbent preferably absorbs chemically. Hence, the liquid carbon dioxide-rich absorbent, L1, comprises a suitable absorbing agent for carbon dioxide or other acid gases. The absorbing agent used for absorption of gaseous carbon dioxide may be any solvent known to be able to absorb carbon dioxide and/or acid gases. As an example can be mentioned, a solution of an alkanolamine, more preferred an alkanolamine having 1 to 3 alkanol residues, more preferred alkanol residues having 1, 2 or 3 carbon atoms, in an aqueous solution. Examples of suitable alkanolamines are monoethanolamine (MEA), diethanolamine (DEA), and tri-ethanolamine (TEA), MEA being the absorbent of choice since it is well tested cheap and effective. The concentration of absorbent is typically in the range of 5-40% in water. An example is monoethanolamine being a 35% solution of MEA in water.

After absorption, prior to being fed to the stripping column, A2, the rich absorbent may be heated and/or pressurised. It is known that carbon dioxide is separated from alkanolamine absorbents by heating, preferably to a temperature of 90° C. and higher, preferably above 90-110° C., more preferred 95° C. or above, 100° C. or above, such as 104° C. to 106° C. The pressure of the liquid carbon dioxide-rich absorbent, L1, may be increased to above atmospheric, such as 1-3 bar, or to a pressure which is higher than the pressure of the stream leaving the absorption column often operated at ambient pressure. The stripping process itself is typically operated at slightly above atmospheric (higher than the operating pressure of the absorption column), such as 1.2 to 2.6 bar, more preferred 1.2 to 1.6 bar such as 1.4 bar. Other pressures are contemplated within the context of the invention.

The liquid carbon dioxide-rich absorbent, L1, is stripped using a stripping medium, G2, said stripping medium substantially comprising steam, i.e. water vapour when the absorbent is aqueous. Advantageously, according to the invention, the stripping medium is partly recirculated water from the stripping procedure itself.

The stripping medium is the stream, G2, which is substantially free of absorbent and comprises water vapour with a low content of carbon dioxide. In the context of the present invention, very low is below 10 mole-%, more preferred below 5 mole-%. In an embodiment the temperature of the stripping medium, G2, is higher than the temperature of the heated liquid carbon dioxide-rich absorbent, L1, and more specifically higher than 100° C., preferably in the range of 105° C. to 120° C., preferably around 115° C. This will provide a more efficient stripping of carbon dioxide from the absorbent.

In the stripping column, A2, carbon dioxide is stripped from the absorbent to provide a carbon dioxide-containing gas stream, G1, and a liquid carbon dioxide-lean absorbent stream, L2.

The carbon dioxide-containing gas stream, G1, is provided at temperature and pressure conditions which are above the evaporation conditions of water. Accordingly, the carbon dioxide-containing gas stream, G1, is a mixture of carbon dioxide and water vapour.

The carbon dioxide-lean absorbent, L2, typically leaves the lower part of the stripping unit, A2. However, it is contemplated that the stream may be drawn from any suitable position of the column.

In the context of the present invention the term "lean" is intended to mean a stream containing an amount of absorbed carbon dioxide which is lower than the amount of the carbon dioxide in liquid carbon dioxide-rich absorbent, L1. Thus, the liquid carbon dioxide-lean absorbent stream, L2, comprises less that 10 mole-% carbon dioxide, typically less than 5 mole-% carbon dioxide.

The liquid carbon dioxide-lean absorbent stream, L2, is subsequently heated by indirect heat exchange in the third heat exchanger, A6, to provide a gas/liquid heated carbon dioxide-lean absorbent, L2', which is a gas/liquid mixture. The reboiling is normally obtained by use of a closed steam generating loop normally used in the art, but other means are contemplated. In the embodiment shown, the gas/liquid mixture is further separated in the second separator, A7, providing the evaporated stripping medium, G2', and recovered liquid absorbent, L3. The evaporated stripping medium, G2', is fed to the stripping column, A2, as the stripping medium, G2, and the recovered liquid absorbent, L3, are returned to the absorber, most often in heat exchange with the liquid carbon dioxide-rich absorbent, L1 as is customary in the art.

Part of the thermal energy comprised in the carbon dioxide-containing gas stream, G1, is transferred to a heat transfer fluid, L4, thereby providing a cooled carbon dioxide-containing gas stream, G3, and a heated stream, L4'.

The heat transfer is performed in a heat recovery unit, A3. It is preferred that the heat exchange is by direct contact, where the heat transfer fluid, L4, and the carbon dioxide-containing gas stream, G1, are in physical contact with each other.

By using direct contact the heat exchange will be more efficient and can reach almost 100% depending on the size and/or the flow of the respective streams. In addition, both water condensed from the carbon dioxide containing gas stream, G1, and water from the heat transfer fluid will be mixed and may be used in the recirculation to the stripping column and the heat transfer, respectively.

In that way it is ensured that an absolute minimum of supply water/fluid is needed in the process, which will give an overall cost saving for the process.

It necessarily follows that the temperature of the heat transfer fluid, L4, is lower than the temperature of the carbon dioxide-containing gas stream, G1. In an embodiment the temperature of the carbon dioxide containing gas stream, G1, is in the range of 90° C. to 115° C. and the heat transfer fluid, L4, is in the range of 65° C. to 80° C.

Thus, in an exemplary embodiment the heat exchanger is a direct contact cooler, and the temperature of the heat transfer fluid, L4, is app. 70° C., the temperature of the carbon dioxide-containing gas stream, G1, is typically 102° C. and the mass flow ratio of the respective streams, G1:L4, is approx. 1:9 (kg/h)/(kg/h) and the height of the heat transfer of the direct contact cooler is approx. 4 m and the diameter is approx. 0.7 m when the packing material is pall rings (random packed).

With these relative values a complete heat transfer will occur so that the temperature of the heated heat transfer fluid is approximately the same as the temperature of the carbon dioxide-containing gas stream, G1, and the cooled carbon dioxide-containing stream, G3, has the same temperature as the heat transfer fluid, L4. It is contemplated that the temperatures, flows and dimensions may vary. Depending on the choice of a specific parameter the skilled person will be able to determine the remaining parameters for example using any simulation program suitable for thermodynamic calculations; such programs are well known in the art.

Accordingly, this step provides recovery of thermal energy from the carbon dioxide-containing gas stream, G1, to the heat transfer fluid, L4. The cooling also results in the condensation of water vapour present in the carbon dioxide containing gas, G1, providing the heated stream, L4', comprising condensed water vapour from the carbon dioxide containing gas stream, G1 as well as the heat transfer fluid, L4, now heated.

This cooling of the carbon dioxide containing gas stream, G1, provides water from the process which is to be further processed and recirculated to the stripping step as being the stripping medium and in particular embodiments also the heat transfer fluid.

Hence, the major part of the heat transfer fluid, L4, is preferably derived from the process itself in a loop of stripping medium which is being condensed and recirculated and used as at least part of the heat transfer fluid.

In another particular embodiment a portion of the heat transfer fluid, L4, originates from the absorption step preceding the stripping step. If the absorption step creates excess heat the absorber may be provided with cooling means, such as a reflux condenser. The effect of this is to reduce absorbent loss and evaporation of water in the absorber. Cooling condenses water and absorbent and this condensate may be used as the, or part of the heat transfer fluid, L4. Hence when the absorption creates heat more water can be collected internally and thereby more steam may be produced for the stripping step.

Thus, heat transfer fluid, L4, or part of the heat transfer fluid may be externally supplied, be derived from the absorption procedure preceding the method of the invention or a combination of all of the above.

The heated stream, L4', is subjected to a flash separation step in the flash separation unit, A9, which provides the recovered stripping medium, G4, and the condensed stripping medium, L5.

The cooled carbon dioxide-containing stream, G3, described above is further heat exchanged and separated in the first separator, A5, to provide carbon dioxide product stream, G5, and the second liquid stream, L6, this further cooling of the cooled carbon dioxide-containing stream, G3, ensures that even more water (fluid) is removed from the carbon dioxide gas. At this point the gas will contain below 5 mole-% water. If desired the carbon dioxide product stream, G5, may be subjected to a final purification step, such as condensation, distillation, adsorption or a combination.

In the following description of the figures all streams and steps as they appear from FIG. 1 are the same.

Figure 2:
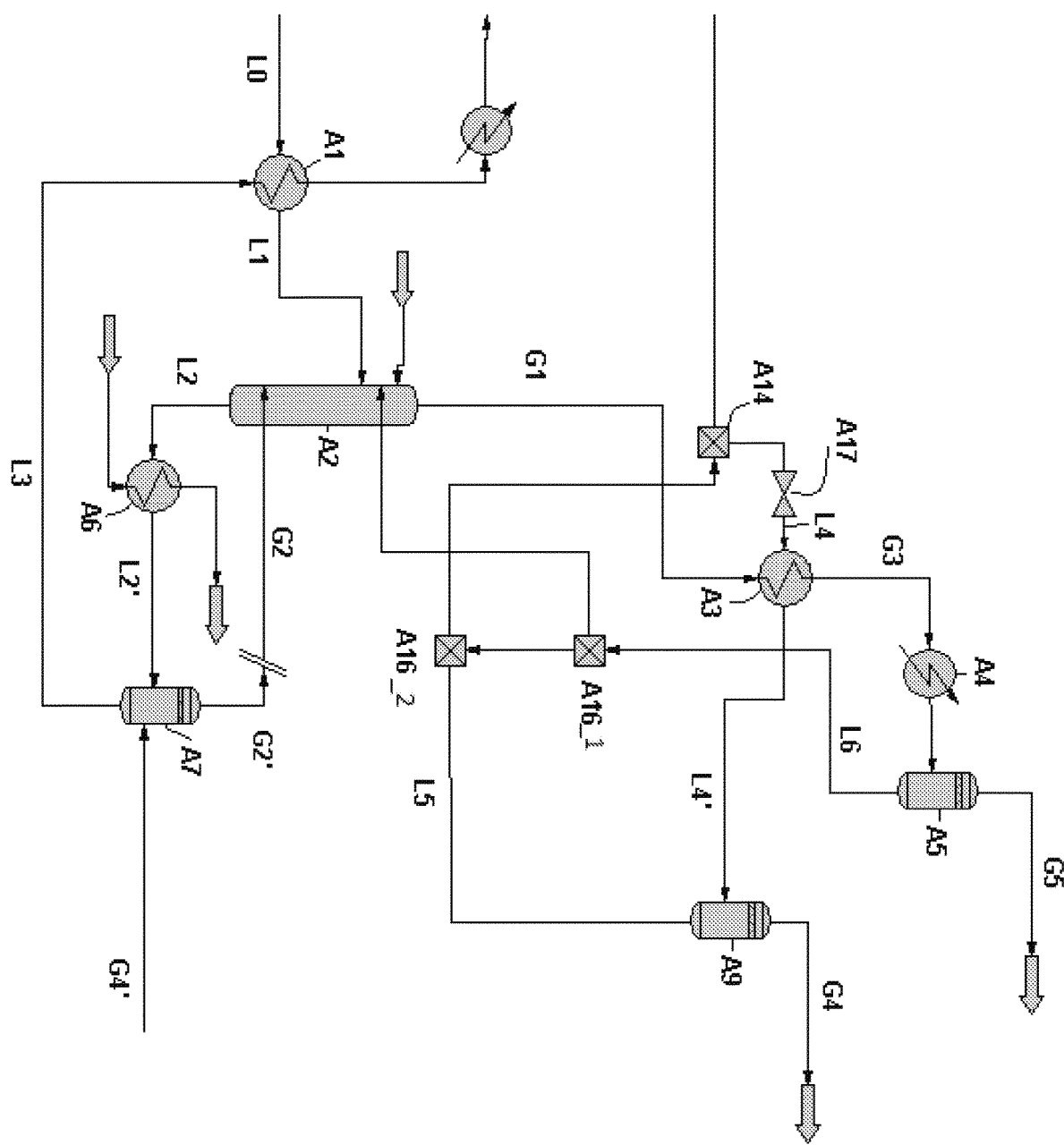
FIG. 2 illustrates the method and plant applying indirect contact heat exchange.

Referring now to FIG. 2, another embodiment is shown in which the heat exchange between the carbon dioxide-containing gas stream, G1, and the heat transfer fluid, L4, is carried out by indirect cooling. Accordingly, the primary difference between the embodiment presented in FIGS. 1 and 2 is the type of heat transfer applied according to step c. In FIG. 2 indirect heat exchange is applied. Accordingly, no mixing of the two streams, G1 and L4, occurs.

In this embodiment a third pressure reducing unit, A17, is shown prior to the heat transfer in the heat recovery unit, A3, in order to reduce the pressure of the heat transfer fluid, L4. The liquid heat carrier, L5, recovered from the flash separation unit, A9, is recirculated to a mixing unit, A14, to be mixed with make up water, this combined stream is pressure reduced to provide the heat transfer fluid, L4. It is also contemplated that the heat recovery unit (A3) and the flash separation unit (A9) are integrated in one unit.

It is also contemplated (as shown in FIG. 2) that the second liquid, L6, is split in a first unit A16_1 where one fraction is returned to the stripper column, A2, for further purification and a second fraction is mixed with the liquid heat carrier in a second unit A16_2 before entering the mixer unit, A14.

A temperate liquid carbon dioxide-rich absorbent, L0, may be heated in the heat exchanger, A1, prior to feeding to the stripping column, A2, in order to provide the liquid carbon dioxide-rich absorbent, L1, having a temperature which is higher than the temperature of the temperate liquid carbon dioxide-rich absorbent stream, L0. Thus, the temperature of the liquid carbon dioxide-rich absorbent stream, L1, is preferably in the range of 90° C. to 110° C., more preferably in the range of 103° C. to 105° C., most preferred 104° C. as are known temperature ranges for separating carbon dioxide from alkanolamine absorbents.

As is customary the heat exchange in exchanger A1 is typically a heat exchange between the warmer lean absorbent from the stripper L3 and the more temperate rich absorbent L0 from the absorption column. It is also contemplated (not shown) that instead of, or additional to, heat exchanging the warmer lean absorbent from the stripper L3, the stream is drawn by suction, such as by a vacuum pump. Suction over heating improves the operation efficiency. A variation of this embodiment is illustrated further in FIG. 9 and is described below.

Figure 3:
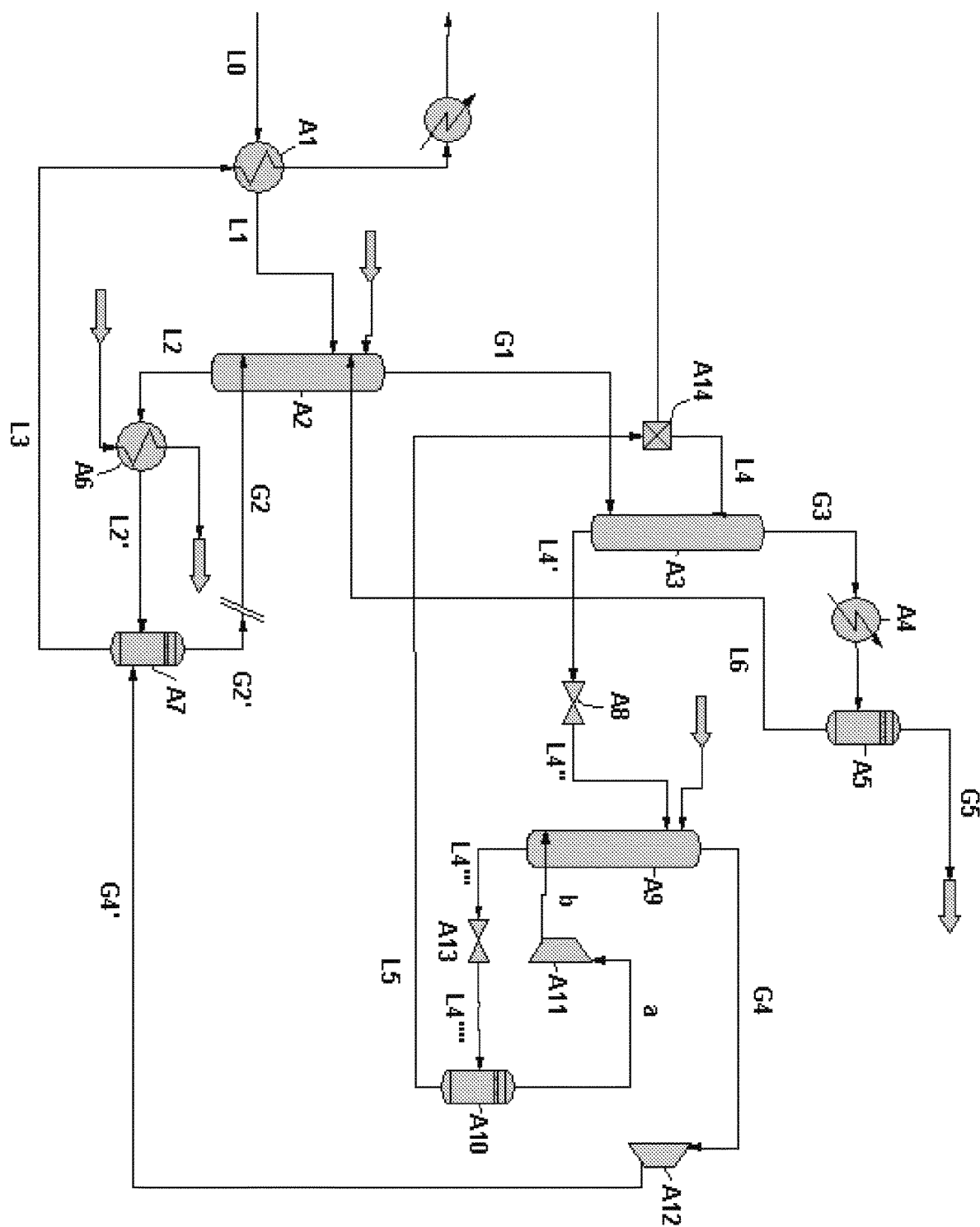
FIG. 3 illustrates the method and plant applying direct contact heat exchange with a subsequent flash separation and separation loop.

The embodiment shown in FIG. 3 also features a direct contact cooler. In this embodiment a heat transfer loop is introduced. The heated stream, L4', provided by the heat transfer step c. is subsequently depressurised into a depressurised stream, L4''. The depressurisation is preferably obtained by means of a valve, more specific a pressure reducing valve, A8. The depressurised stream, L4'', is a gas/liquid mixture. The stream is depressurised to a pressure below the pressure of the heated stream, L4', and preferably to subatmospheric in order to provide a liquid/gas mixture, i.e. below 1 bar/1 atm. Typically, the pressure is reduced to about half of the pressure of the preceding stream, e.g. from about 1.4 bar to about 0.7 bar etc.

A heat transfer loop is included for providing the liquid heat carrier, L5. The flash separation of the depressurised stream, L4'', provides the liquid stream, L4''', and the recovered stripping medium, G4. The liquid stream, L4''', of condensed water is further pressure reduced in a second pressure reducing unit, A13, to provide a second depressurised stream, L4'''', said stream is a gas/liquid mixture. The pressure is similarly preferably halved such as to 0.4 (when the first pressure reduction is to 0.7 bar). The second depressurised stream, L4'''', is then separated in the third separator, A10, to provide the liquid heat carrier, L5, substantially constituted of water, which is recirculated and mixed with make up water to provide the heat transfer fluid, L4.

Before mixing, the pressure of the heat transfer fluid, L4, may be increased to correspond to the pressure of the stripping system, which is typically around 1-1.5 bar, preferably 1.4 bar. Alternatively, when the cooling is by indirect cooling, the pressure may be adjusted to a lower pressure.

The separation in the third separator, A10, also provides a second gas, a, of water vapour. This stream is recompressed to the operating pressure of the flash separation unit, A9, to provide a compressed second gas, b, which is supplied to the flash separation unit, A9, where it is flashed with the depressurised stream, L4'', which provides the recovered stripping medium, G4.

Hence, with the circulation the amount of steam that is extracted from the liquid phase which is to be used as the stripping medium is increased in a simple manner and with a minimum of energy supply.

The recovered stripping medium, G4, provided by the flash separation is then in the embodiment shown recompressed in the second pressure increasing unit, A12, resulting in a compressed recovered stripping medium, G4'. The second pressure increasing unit may be operated with vacuum but suitable alternatives are contemplated. The compressed recovered stripping medium, G4', has a temperature which is substantially higher than the temperature of the recovered stripping medium, G4. The heat follows from the recompression. The compressed recovered stripping medium, G4', is subsequently mixed with the gas/liquid heated carbon dioxide-lean absorbent L2' in the second separator, A7, to provide the evaporated stripping medium G2' and fed to the stripping column A2. It is also contemplated that the compressed recovered stripping medium, G4', is fed directly to the stripping column, A2, or mixed with the evaporated stripping medium G2' prior to entry into the stripping column A2.

Figure 4:
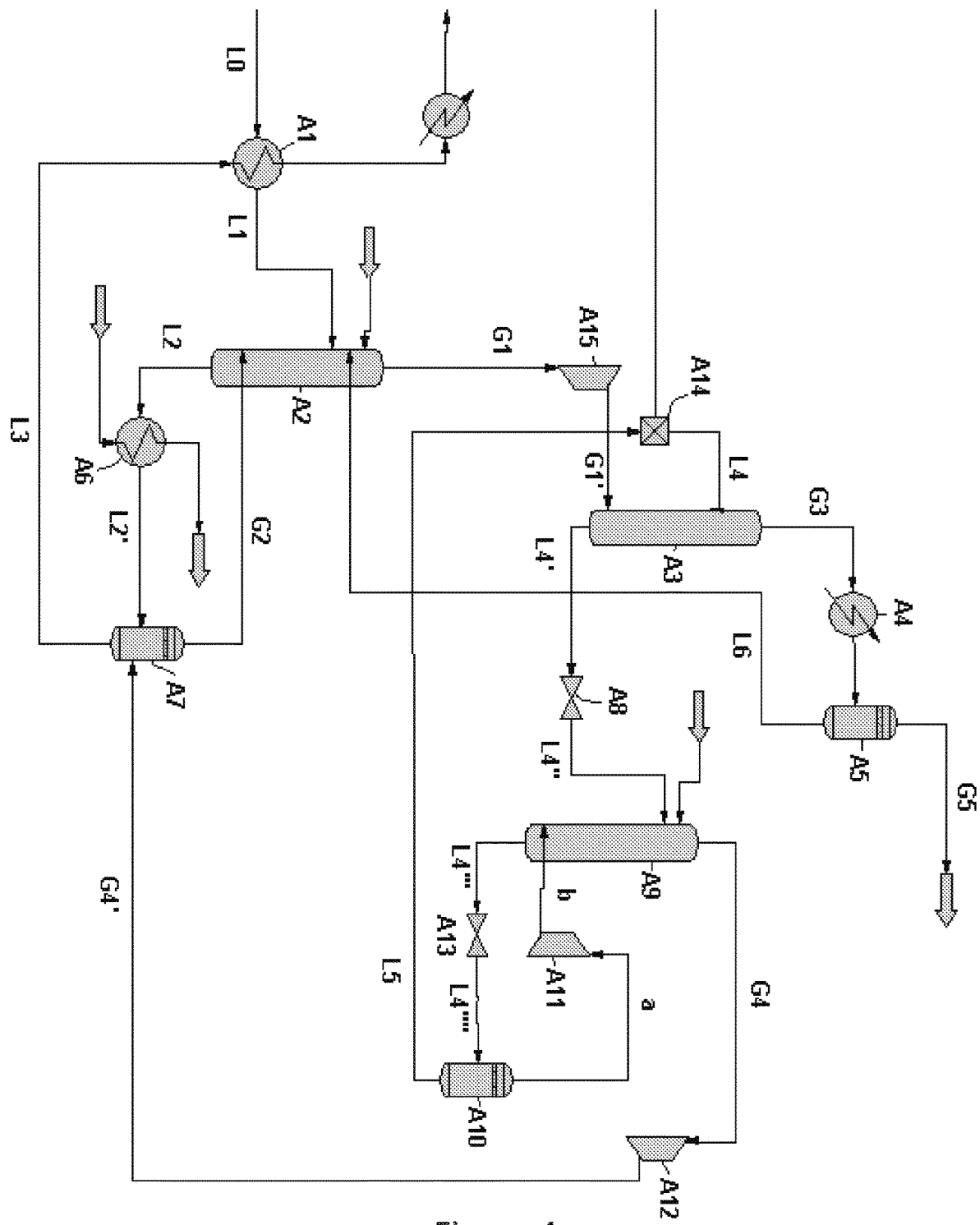
FIG. 4 illustrates the method and plant according to FIG. 3, wherein an additional pressurisation of the acid gas-containing gas stream is performed prior to heat exchange.

The embodiment shown in FIG. 4 is identical to the embodiment of FIG. 3 with the difference that the carbon dioxide-containing gas stream, G1, is compressed using a third pressure increasing unit, A15, before entering the heat recovery unit, A3, to provide a compressed carbon dioxide-containing gas stream, G1'.

Providing a pressurisation step prior to heat exchanging can be made in combination with the use of both a direct contact heat exchanger and an indirect heat exchanger (not shown). When including a compression step at this point, the heat transfer in step c. will be more effective and the fraction of gas in the depressurised stream, L4", before the separation in separator, A9, will provide a larger steam fraction.

Figure 5:
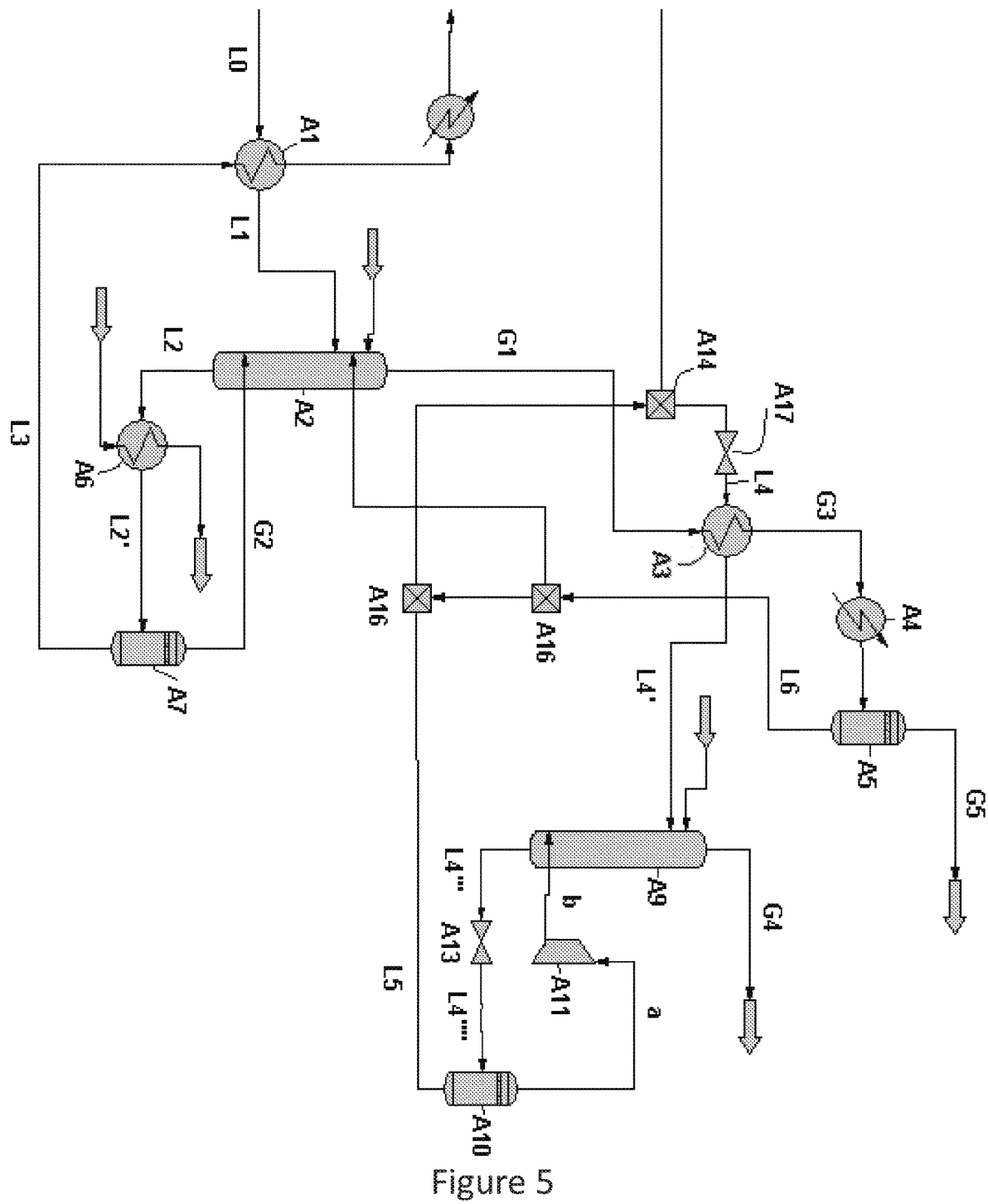
FIG. 5 illustrates the method and plant applying indirect heat exchange with a subsequent flash separation and separation loop, where destination of the recovered stripping medium is unspecified.
Figure 6:
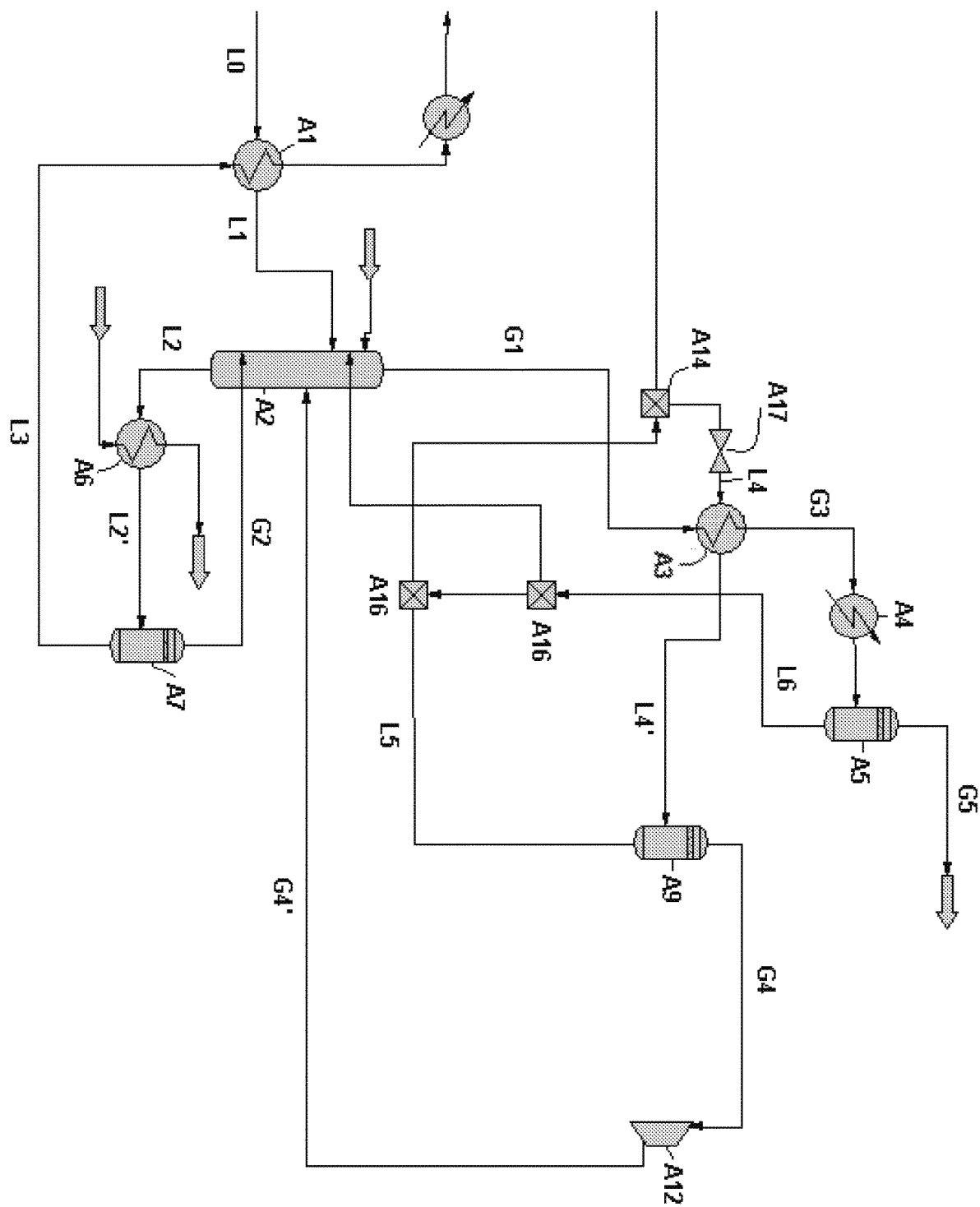
FIG. 6 illustrates the method and plant applying indirect heat exchange where the compressed recovered stripping medium is returned directly to the stripping column.
Figure 7:
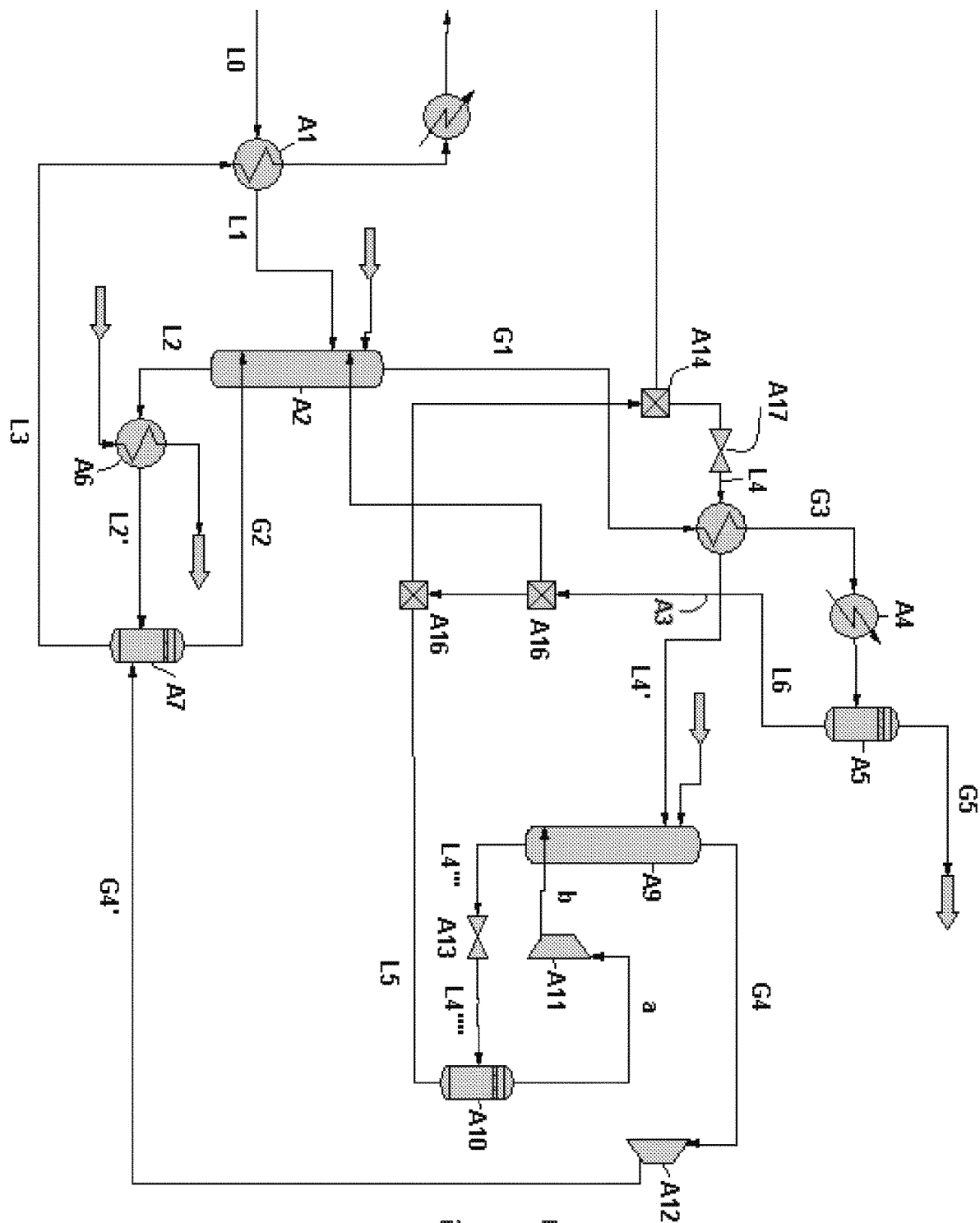
FIG. 7 illustrates the method and plant applying indirect heat exchange where the compressed recovered stripping medium is returned to the second separator.

According to the present invention several embodiments are provided for utilising the recovered stripping medium, G4. In particular, the versatility is illustrated in FIGS. 5 to 7, wherein the recovered stripping medium, G4, may be directly or indirectly provided to the stripping column, A2. Accordingly, in the embodiment shown in FIG. 5 the recovered stripping medium, G4, is not explicitly connected to the second separator, A7, or to the stripping column, A2. The skilled person will acknowledge that provided this most general embodiment, the energy contained in the recovered stripping medium, G4, may be redirected where most efficient according to the invention. However, in an embodiment as shown in FIG. 6 the recovered stripping medium, G4, is compressed to provide a stream of compressed recovered stripping medium, G4', which is returned directly to the stripping column, A2. Although not shown in FIG. 6 it is also contemplated that the compressed recovered stripping medium, G4', is fed to the stripping column, A2, at a position below the feeding of the gaseous stripping medium, G2. It is also contemplated that the recovered stripping medium is fed directly to the stripping column without prior compression in case the pressure is high enough either by pressurisation or gravity or flow facilitated by a liquid pump. In the embodiment shown in FIG. 7 the compressed recovered stripping medium, G4', is connected to the second separator, A7. The compressed recovered stripping medium, G4', is separated in the second separator, A7, together with the gas/liquid heated carbon dioxide lean absorbent stream, L2', to provide the stripper medium, G2, as the gaseous phase and the recovered liquid absorbent stream, L3, which is returned to the absorption procedure upstream.

By recompressing the recovered stripping medium, G4, the stream is heated and is capable of providing a large flow of stripper medium. Also, in preferred embodiments the pressure of the compressed recovered stripping medium, G4', corresponds to the operating pressure of the stripping column whereby the recirculated stream can be used directly without further treatment.

In the embodiment shown the heat transfer fluid, L4, originates from both the recirculation of water from the stripper and water from the flue gas/evaporated water from the absorbent. And hence the heat transfer fluid L4 is substantially a recycled stream from the process itself. In this embodiment there will be a very low amount of externally supplied make up water and this fraction will constitute less than 5% (mole/mole), more preferred less than 3% (mole/mole) even more preferred less than 1% (mole/mole) of the water mass flow in the system.

Figure 8:
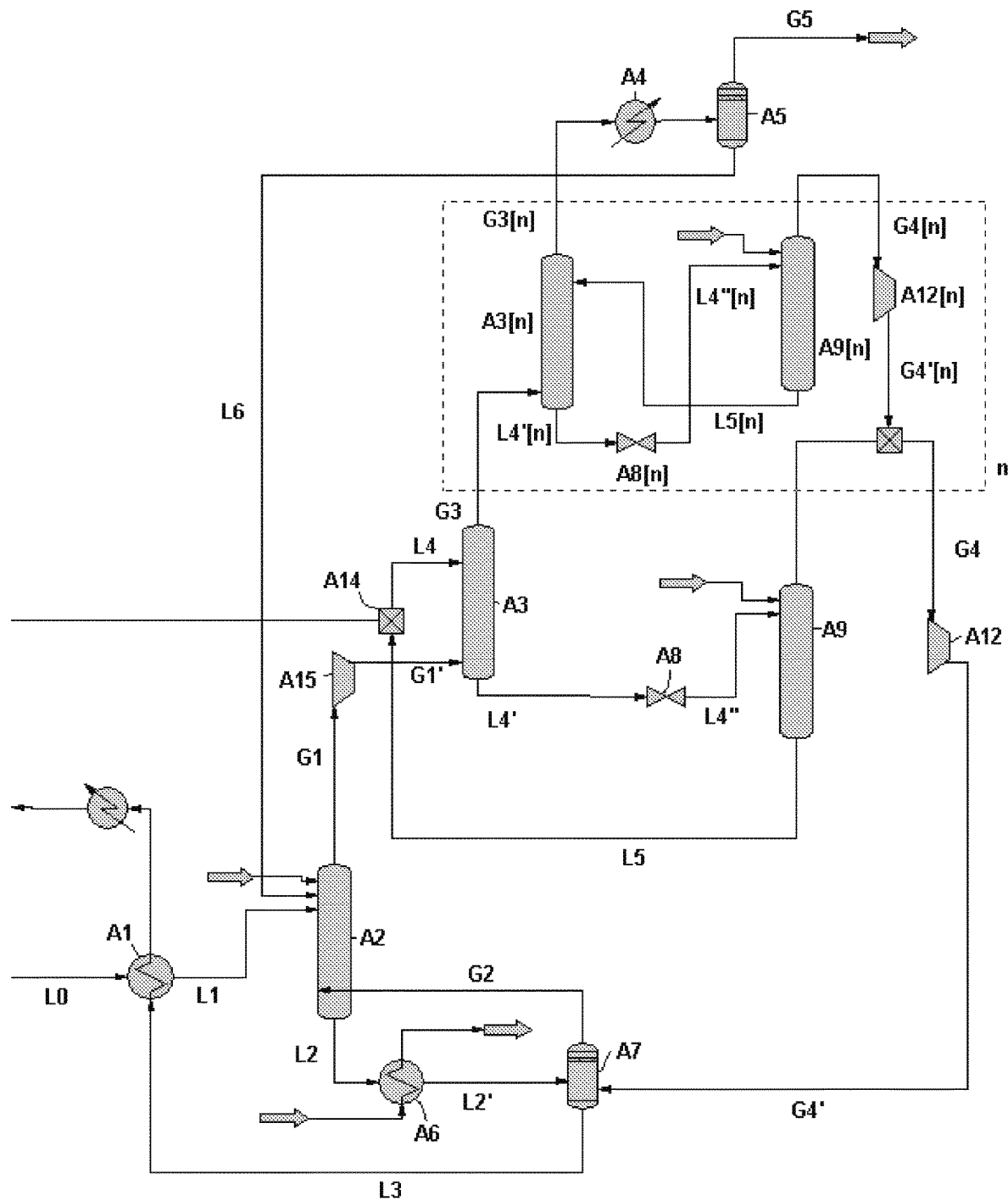
FIG. 8 illustrates the method and plant, wherein a plurality of additional heat transfer loops of direct contact heat exchange and separation is applied.

In another embodiment of the process as depicted in FIG. 8 the heat transfer loop introduced in FIG. 3, is further developed to be comprised by a plurality of heat transfer loops, in this specific embodiment two loops are shown which are connected in parallel. In the embodiment shown the heat transfer is direct heat exchange however indirect heat exchange can equally be employed.

Hence, in the figure [n] denotes the loop number in addition to the first loop. When there is only one loop the number is omitted. Hence, in the context of the invention n will be an integer from 2 or greater than 2, such as 2, 3, 4, 5, 6 etc.

Hence, in this embodiment the cooled carbon dioxide-containing stream, G3, leaving the direct contact cooler, A3, enters a second direct contact cooler, A3[2], in which the stream is further cooled with a recycled stream of a second liquid heat carrier, L5[2], providing a second heated stream, L4'[2], and a second cooled carbon dioxide-containing stream G3[2]. Similarly, to the first loop, the second heated stream, L4'[2], is pressure reduced (A8[2]), and separated (A9[2]) into a second recovered stripping medium, G4[2], and the second liquid heat carrier L5[2]. The second recovered stripping medium, G4[2], is compressed and mixed with the recovered stripping medium, G4. The combined streams are then fed to the stripper column, optionally with prior compressing and separation, as shown in FIG. 8.

In the same manner as described above it is possible to add further heat transfer loops in which case the next input gas to the third contact cooler (A8[3]) would be the second cooled carbon dioxide-containing stream G3[2] and so on.

The heated stream, L4', undergoes essentially the same steps as described in FIG. 1, i.e. it is pressure reduced to provide the depressurised stream, L4", which is separated in the flash separation unit, A9, providing the recovered stripping medium, G4, and the liquid heat carrier, L5.

In the embodiment shown the liquid heat carrier is recycled and mixed with a make up stream to provide the heat transfer fluid, L4, and, the recovered stripping medium, G4, is mixed with the compressed second recovered stripping medium, G4'[2], the combined fractions are compressed in the compressor A12, to provide the compressed recovered stripping medium, G4', which as shown is fed to the second separator, A7. With this embodiment, however, it is also contemplated that the compressed recovered stripping medium, G4', is fed directly to the stripping column or mixed with the stripping medium, G2 before being fed to the stripping column.

Similar to the parallel loops, it is also advantageous to have loops connected serially. Referring to FIG. 3, in case of more loops in series, the liquid stream leaving the third separator, A10, (the liquid heat carrier, L5) would be depressurised to provide a gas/liquid mixture, this stream would be separated in a further separator (A10[2]), where the liquid would correspond to the heat transfer liquid, L5, which is recirculated as part of the heat transfer fluid and the gas would be compressed in a compressor (A11[2]) fed to the third separator, A10, and from there on follow the route described in FIG. 3.

In the same way as described above it is foreseen that a plurality of loops may be inserted both in parallel and in series. It is preferred that there are 1, 2 or 3 loops in parallel and/or series. Such as two parallel loops and 1, 2 or 3 in series.

By including n loops in parallel more fluid (water) is condensed from the product gas G3[$n$] (wherein n is an integer, such as 2, 3, 4, 5, 6, etc.) providing both a cleaner product stream avoiding some downstream purification steps, and also providing more stripping steam for use in the stripping. The fluid/water in the product stream is traditionally provided to the stripper as a liquid and is therefore not utilized as stripping medium. By including more loops in series more steam is provided for the stripping.

Figure 9:
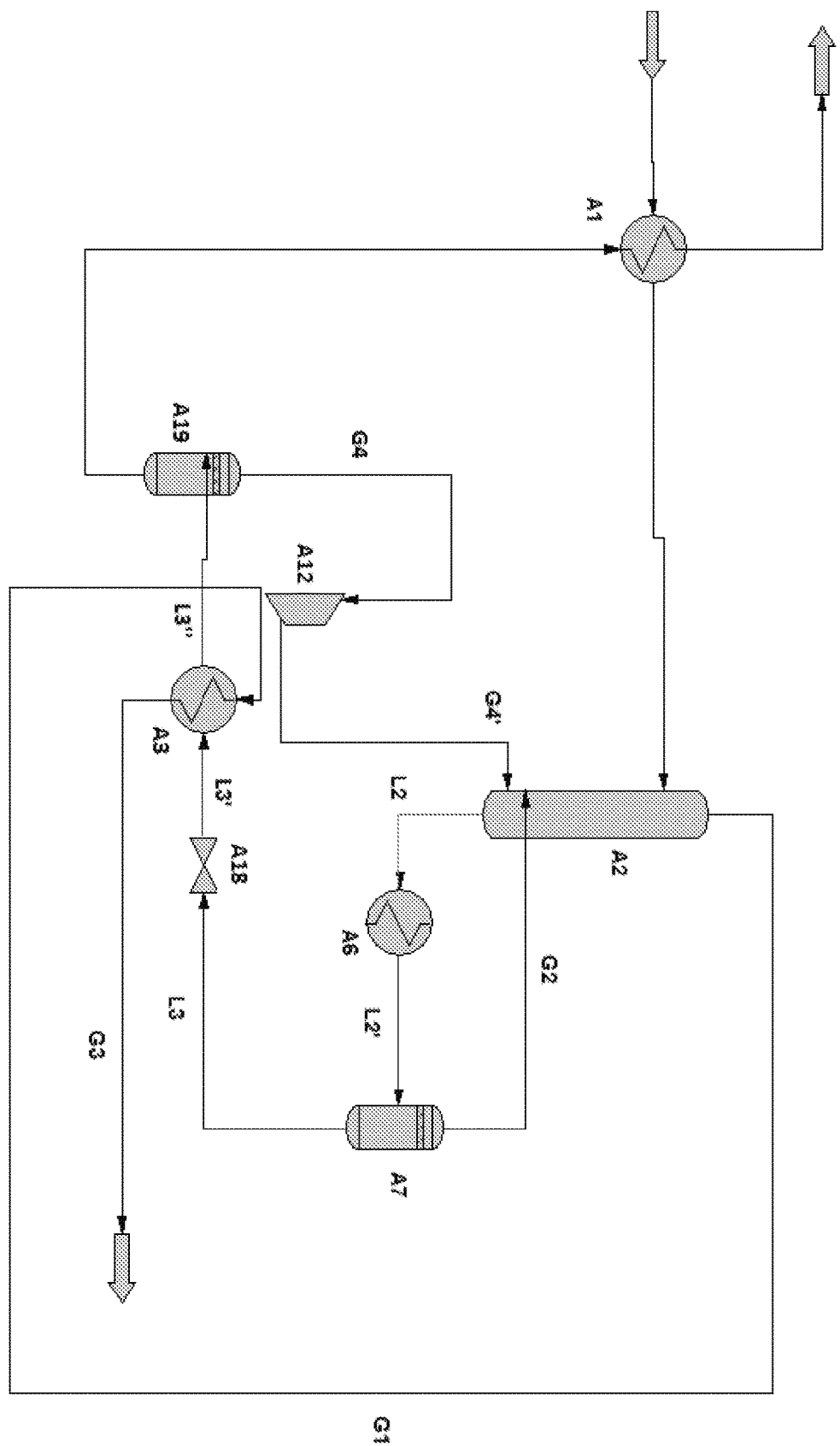
FIG. 9 illustrates the method and plant, wherein the heat transfer fluid is the recovered liquid absorbent.

Referring to FIG. 9 a further embodiment of the invention is illustrated in which the acid gas-containing gas stream, G1, leaving the stripper, A2, is fed to the heat recovery unit, A3, which in the embodiment shown is an indirect heat exchanger. The recovered liquid absorbent stream L3, is depressurised in the fourth pressure reducing unit A18 as illustrated a valve, to provide a depressurised recovered liquid absorbent L3' and subsequently passed through the heat recovery unit A3. Heat from the acid gas-containing gas stream, G1, is transferred to the depressurised recovered liquid absorbent stream, L3', to provide a heated recovered liquid absorbent stream, L3", which is a gas/liquid mixture. The heated recovered liquid absorbent stream, L3", is separated in a fourth separator, A19, to provide a recovered absorbent and the recovered stripping medium G4. The recovered stripping medium is compressed (such as in the second pressure increasing unit A12) before being fed to the stripping column A2 as the compressed recovered stripping medium G4'.

The preferred number may vary depending on the cost of further equipment vs. reduction in costs for providing additional stripping steam with the third heat exchanger A6.

Tests have revealed that when the solvent is aqueous and when the temperature of the recovered stripping medium (G4) is 70° C. the partial pressure of water is 0.31 bar (a) and reducing the temperature further will not result in any substantial increase in heat recovery due to condensation of water and hence no substantial effects are seen by including more loops.

Another aspect of the present invention relates to a plant for recovery of carbon dioxide from a liquid carbon dioxide-rich absorbent, said plant comprising a stripping column, A2, having a gas inlet through which a stripping medium (G2) can be fed and a liquid inlet through which a liquid carbon dioxide-rich absorbing agent (L1) can be fed, said gas outlet being connected to a heat recovery unit, A3, additionally having a heat transfer fluid inlet, a product gas outlet and a second liquid outlet, said second liquid outlet being connected directly or indirectly to the stripping column, A2. In a further embodiment, the second liquid outlet of the heat recovery unit, A3, is connected to a first pressure reducing unit, A8, which is then directly or indirectly connected to the stripping column (A3). In an embodiment the plant comprises a second separator, A7, wherein the second separator, A7, has a further liquid inlet connected through a third heat exchanger, A6, to the liquid outlet of the stripping column, A2, a liquid outlet and a gas outlet connected directly to the gas inlet of the stripping column, A2.

In a further embodiment of the plant the pressure reducing unit, A8, is indirectly connected to the stripping column, A2, and the first pressure reducing unit, A8, is connected to a flash separation unit, A9, the flash separation unit, A9, additionally having a gas inlet, a liquid outlet and a gas outlet, the gas outlet being connected to a second pressure increasing unit, A12, which is connected to the second separator, A7, the liquid outlet is connected to a second pressure reducing unit, A13, which is connected to a third separator, A10, further having a gas outlet and a liquid outlet, the gas outlet is connected to a first pressure increasing unit, A11, which is connected to the gas inlet of the flash separation unit, A9, and wherein the liquid outlet of the second separator, A7, is connected, optionally through a pump and/or optionally a mixer unit, A14, with the liquid inlet of the heat transfer fluid inlet of the a heat recovery unit, A3.

In another embodiment the heat recovery unit, A3, is a direct contact heat exchanger.

It is contemplated that one or both of the pressure reducing units, A8 and A12, is a pressure reducing valve and or that one or both of the pressure increasing units, A11 and A12, is operated with vacuum pump.

Heat exchangers for use according to the present invention may in principle be of any type. It is within the skills of the person skilled in the art to select a suitable heat exchanger based on the estimated flows of absorbent, gas and receiving medium as well as the estimated amount of thermal energy to be transferred in order to provide for a more optimal temperature in the absorber, and in order to recover heat in order to improve the energy economics of the total plant.

The plant further comprises a stripping column, A2. The stripping column to be used in the plant may be any packed column known in the art. Examples of suitable stripping columns are columns, which contain internals or mass transfer elements such as trays or random or structured packing. Typically, heated carbon dioxide-containing gas stream is leaving the top of the stripper and a liquid carbon dioxide-lean absorbent stream is leaving the bottom of the stripper.

The purified gaseous carbon dioxide stream is after cooling leaving the top of the heat recovery unit, A3, and is then separated in the first separator, A5, to remove the final minute amounts of water in the stream. The purified carbon dioxide leaves the separator as the gaseous product, and the condensed water stream returning to the stripping column is leaving the bottom of the condensation unit, A5.

The stripping column, A2, may further have an additional inlet for make up water, which is fed at the top of the stripper, and a further inlet for condensed carbon dioxide-depleted water recovered in the first separator, A5.

The plant further comprises a heat recovery unit, A3, for cooling the carbon dioxide-containing gas stream. The heat recovery unit may be direct or indirect contact cooler, and is preferably a direct contact cooler. Based on the mass flow and temperature and pressure conditions a person skilled in the art will be able to determine the height of a direct contact heat exchanger required for cooling the carbon dioxide-containing gas stream, G1.

The plant in an embodiment further comprises one or more flash units and one or more separators which are well known in the art. The flash unit according to the invention may be a simple knock out drum or a vapour/liquid separator. In particular the separators A5, A7 and A10 are simple liquid/vapour separators, also known as knock out drums or flash drums having only one inlet and then a gas and a liquid outlet. The flash unit A9 is preferably a flash separation unit but may also be a simple knock out drum if the streams are clean enough.

The plant further comprises one or more pressure increasing units for compressing the heated cooling fluid into vapour. The pressure increasing unit may be a compressor, steam ejector, a blower or the like. In the present invention, since the preferred stream is a water vapour, the preferred pressure increasing unit is capable of vapour recompression, such as a roots, centrifugal or screw type compressor.

When selecting suitable materials for each of said units, special consideration must be directed to the temperature, the pressure, and the chemical and physical properties of the gases and liquids to be treated. However, such consideration will be within the knowledge of a person skilled in the art.

Furthermore, a skilled person can easily recognise that the selection and control of process parameters will depend on the chemical composition of the gas entering the plant as well as the chemical composition and physical condition of the gases and liquids in each step of the method.

The term "reduction of overall energy consumption" is to be understood broadly. According to the present invention reduction of overall energy consumption means that the factual energy supplied is reduced and/or the amount of utilisable energy recovered is increased. The reduced energy consumption may be viewed in isolation for the relevant section of the larger facility. However, the reduced energy consumption for such a section view in isolation should not come at the expense of increased energy consumption in the upstream and/or downstream sections of the larger facility.

The consumed energy may for example be in the form of electricity, high pressure steam, low pressure steam and/or hot water for warming purposes. Accordingly, mutatis mutandis, decreasing the amount of at least one of these forms of energy in the section of the larger facility is to be understood as a reduction of overall energy consumption.

The following detailed exemplary compositions of the streams may apply equally to all embodiments of the present invention.

In an embodiment using MEA as the absorbent, the stream, L0, comprises from about 70 to 85 mole-% of water, from about 5 to 15 mole-% of MEA and from about 2.5 to 10 mole-% of carbon dioxide, and has a temperature in the range of from about 45° C. to 50° C., such as around 47° C., at a pressure of about 3 bar.

The stream, L1, comprises from about 70 to 85 mole-% of water, from about 5 to 15 mole-% of MEA and from about 2.5 to 10 mole-% of carbon dioxide, and has a temperature in the range of from about 100° C. to 110° C., such as around 104° C., at a pressure of about 3 bar.

The stream, L2, comprises from about 80 to 90 mole-% of water, from about 5 to 15 mole-% of MEA and from about 0 to 5 mole-% of carbon dioxide, and has a temperature in the range of from about 105° C. to 115° C., such as around 112° C., at a pressure of about 1.4 bar.

The stream, L2', comprises from about 80 to 90 mole-% of water, from about 5 to 15 mole-% of MEA and from about 0 to 5 mole-% of carbon dioxide, and has a temperature in the range of from about 105° C. to 120° C., such as around 113° C., at a pressure of about 1.4 bar, and has a vapour mole fraction of about 0.1.

The stream, L3, comprises from about 80 to 90 mole-% of water, from about 5 to 15 mole-% of MEA and from about 0 to 5 mole-% of carbon dioxide, and has a temperature in the range of from about 110° C. to 120° C., such as around 113° C., at a pressure of about 1.4 bar, and has a vapour mole fraction of about 0.

The stream, L4, comprises from about 99.8 to 100 mole-% of water, from about 0 to 0.1 mole-% of MEA and from about 0 to 0.1 mole-% of carbon dioxide, and has a temperature in the range of from about 70° C. to 80° C., such as around 75° C., at a pressure of about 3 bar.

The heated stream, L4', comprises from about 99.8 to 100 mole-% of water, from about 0 to 0.1 mole-% of MEA and from about 0 to 0.1 mole-% of carbon dioxide, and has a temperature in the range of from about 90° C. to 100° C., such as around 94° C., at a pressure of about 1.4 bar.

The stream, L4", comprises from about 99.8 to 100 mole-% of water, about 0 to 0.1 mole-% of MEA and from about 0 to 0.1 mole-% of carbon dioxide, and has a temperature in the range of from about 85° C. to 95° C., such as around 89° C., at a pressure of about 0.7 bar.

The stream, L4''', comprises from about 99.8 to 100 mole-% of water, about 0 to 0.1 mole-% of MEA and from about 0 to 0.1 mole-% of carbon dioxide, and has a temperature in the range of from about 85° C. to 95° C., such as around 89° C., at a pressure of about 0.7 bar.

The stream, L4'''', comprises from about 99.8 to 100 mole-% of water, about 0 to 0.1 mole-% of MEA and from about 0 to 0.1 mole-% of carbon dioxide, and has a temperature in the range of from about 70° C. to 80° C., such as around 75° C., at a pressure of about 0.4 bar.

The stream, L5, comprises from about 99.8 to 100 mole-% of water, about 0 to 0.1 mole-% of MEA and from about 0 to 0.1 mole-% of carbon dioxide, and has a temperature in the range of from about 70° C. to 80° C., such as around 75° C., at a pressure of about 0.4 bar.

The stream, L6, comprises from about 99.8 to 100 mole-% of water, about 0 to 0.1 mole-% of MEA and from about 0 to 0.1 mole-% of carbon dioxide, and has a temperature in the range of from about 45° C. to 55° C., such as around 50° C., at a pressure of about 1.4 bar.

The stream, G1, comprises from about 55 to 65 mole-% of water and from about 35 to 45 mole-% of carbon dioxide, and has a temperature in the range of from about 90° C. to 120° C., such as around 94° C., at a pressure of about 1.4 bar.

The stream, G2, comprises from about 90 to 100 mole-% of water, about 0 to 2 mole-% of MEA and from about 2 to 10 mole-% of carbon dioxide, and has a temperature in the range of from about 105° C. to 120° C., such as around 113° C., at a pressure of about 1.4 bar.

The stream, G3, comprises from about 25 to 35 mole-% of water, and from about 65 to 75 mole-% of carbon dioxide, and has a temperature in the range of from about 70° C. to 80° C., such as around 76° C., at a pressure of about 1.4 bar.

The stream, G4, comprises from about 97 to 100 mole-% of water, about 0 to 0.1 mole-% of MEA and from about 0 to 3 mole-% of carbon dioxide, and has a temperature in the range of from about 85° C. to 95° C., such as around 89° C., at a pressure of about 0.7 bar.

The stream, G4', comprises from about 97 to 100 mole-% of water, about 0 to 0.1 mole-% of MEA and from about 0 to 3 mole-% of carbon dioxide, and has a temperature in the range of from about 160° C. to 180° C., such as around 170° C., at a pressure of about 1.4 bar.

The stream, G5, comprises from about 5 to 10 mole-% of water and from about 90 to 95 mole-% of carbon dioxide, and has a temperature in the range of from about 45° C. to 55° C., such as around 50° C., at a pressure of about 1.4 bar.

The stream, a, comprises from about 99.8 to 100 mole-% of water, and from about 0 to 0.2 mole-% of carbon dioxide, and has a temperature in the range of from about 70° C. to 80° C., such as around 75° C., at a pressure of about 0.4 bar.

The stream, b, comprises from about 99.8 to 100 mole-% of water, and from about 0 to 0.2 mole-% of carbon dioxide, and has a temperature in the range of from about 130° C. to 145° C., such as around 138° C., at a pressure of about 0.7 bar.

For all the streams it applies that the sum of constituents does not exceed 100 mole-%. The streams may comprise additional constituents, such as nitrogen and/or oxygen.

EXAMPLES

The present invention is further illustrated in more detail by way of the following example. This example should not be construed as a limitation of the scope of the present invention.

Example 1

The following example refers to calculated example of a section of a larger facility as essentially depicted in FIG. 3. The parameters for the streams in the example are summarised in the table 1 below.

A temperate liquid carbon dioxide-rich absorbent stream, L0, having absorbed gaseous carbon dioxide was provided with a mass flow of about 16,462 kg/h at a temperature of about 47° C., and heated to approximately 104° C., i.e. providing the liquid carbon dioxide-rich absorbent, L1. The stream, L1, then entered a stripping unit (A3) and was mixed with a stripper medium, G2, supplied at a mass flow of about 1,870 kg/h and a temperature of about 97° C. The stripping procedure resulted in the separation into a carbon dioxide-containing gas stream, G1, having a temperature of about 94.6° C. and a liquid carbon dioxide-lean absorbent stream, L2, having a temperature of about 112° C. The carbon dioxide-containing gas stream, G1, was cooled by direct contact heat exchanging with a stream of liquid heat transfer medium, L4, supplied at a flow rate of about 15,000 kg/h and having an initial temperature of about 76° C. in order to provide a cooled carbon dioxide-containing stream, G3, having a temperature of about 76° C. and a heated stream, L4', having a temperature of about 94° C. The heated stream, L4', was subsequently decompressed by use of a pressure reducing valve (A8) into a depressurised stream, L4''. Said depressurised stream L4'' was separated in the flash separation unit (A9) providing the recovered stripping medium G4 having a temperature of about 90° C. and a pressure about 0.7 bar, which was compressed in the second pressure increasing unit (A12) resulting in a temperature of about 170° C. and a pressure about 1.4 bar. The flash separation also resulted in the liquid stream L4''' having a temperature and pressure as the recovered stripping medium, G4. The liquid stream L4''' was then further pressure reduced in a second pressure reducing unit (A13) to a pressure and temperature of 0.4 bar and 76° C., the liquid stream L4''' was then separated into the second gas, a, which was recompressed in the first compressor (A11) to the compressed second gas, b, to pressure of 0.7 bar. The second gas was returned to the flash separation unit (A) and leaving as part of the recovered stripping medium G4.

The liquid carbon dioxide-lean absorbent stream, L2, leaving the stripper (A2) was heated in a third heat exchanger (A6) using external heat, this provided the gas/liquid heated carbon dioxide-lean absorbent stream, L2', having a temperature of about 113° C. for mixing in a second separator (A7) with the compressed recovered stripping medium, G4', with the mass flows of about 16,760 kg/h (L2') and 538 kg/h (G4'), respectively. The mixture of gas/liquid heated carbon dioxide-lean absorbent stream, L2', and compressed recovered stripping medium, G4', was then separated, thus providing a recovered liquid absorbent stream, L3, with a mass flow of about 15,428 kg/h and the stripper medium, G2, having a mass flow of about 1870 kg/hour, a temperature of about 113° C. and a pressure of 1.4 bar.

It follows from this example that the circulation of the water from the carbon dioxide-containing gas stream (G1), can be provided again to the stripping unit (A2) and constitutes about ⅓ of the stripping medium without compromising yield and purity of the resulting carbon dioxide.

Hence, one third of the energy otherwise supplied in the form of a steam loop can be replaced by the stream work of the water vapour already present.

Based on the example illustrated above the first pressure increasing unit (A11) would have a power uptake of 13 kW and the second pressure increasing unit (A12) an uptake of 23 kW electrical power, i.e. 36 kW for operating the units. This electrical power corresponds to 108 kW steam power.

The steam generated by the process in the example (G4') amounts to 334 kW (2230 kJ/kg*523 kg/3600) and hence the overall energy reduction in the example illustrated was 226 kW Steam. This corresponds approx. to more than a 20% energy reduction.

TABLE 1

| | FLOW SUMMARIES: | | | | |
|---|---|---|---|---|---|
| Stream No. | L0 | L1 | L2 | L2' | L3 |
| Temp C. | 47.61 | 104.00 | 112.20 | 113.16 | 113.23 |
| Pres bar | 3 | 3 | 1.4 | 1.4 | 1.4 |
| Enth kW | −53,005.00 | −52,074.00 | −54,404.00 | −53,623.00 | −48,988.00 |
| Vapor mole frac. | 0.00 | 0.00 | 0.00 | 0.10 | 0.00 |
| Total kmol/h | 649.94 | 649.94 | 696.75 | 696.92 | 629.39 |
| Total kg/h | 16,462.35 | 16,462.35 | 16,756.94 | 16,760.64 | 15,428.40 |
| Total std L m3/h | 16.73 | 16.73 | 16.82 | 16.83 | 15.47 |
| Total std V m3/11 | 14,567.44 | 14,567.44 | 15,616.77 | 15,620.62 | 14,106.85 |
| Component mole % | | | | | |
| Carbon Dioxide | 6.42 | 6.42 | 2.79 | 2.79 | 2.57 |
| Nitrogen | 0.00 | 0.00 | 0.00 | 0.00 | 0.00 |
| Oxygen | 0.00 | 0.00 | 0.00 | 0.00 | 0.00 |
| Water | 80.47 | 80.47 | 84.88 | 84.88 | 83.89 |
| Monoethanolamine | 13.11 | 13.11 | 12.33 | 12.33 | 13.54 |
| Methane | 0.00 | 0.00 | 0.00 | 0.00 | 0.00 |

TABLE 1-continued

FLOW SUMMARIES:

| Stream No. | L4 | L4' | G1 | G2 | G3 |
|---|---|---|---|---|---|
| Temp C. | 75.90 | 94.26 | 94.58 | 113.23 | 76.57 |
| Pres bar | 3 | 1.4 | 1.4 | 1.4 | 1.4 |
| Enth kW | −65,201.00 | −67,046.00 | −5,337.60 | −6,584.10 | −3,491.30 |
| Vapor mole frac. | 0.00 | 0.00 | 1.00 | 1.00 | 1.00 |
| Total kmol/h | 831.80 | 859.38 | 63.81 | 96.90 | 36.21 |
| Total kg/h | 15,000.00 | 15,505.53 | 1,822.77 | 1,869.97 | 1,316.83 |
| Total std L m3/h | 15.00 | 15.51 | 2.06 | 1.90 | 1.55 |
| Total std V m3/11 | 18,643.73 | 19,261.84 | 1,430.29 | 2,171.94 | 811.69 |
| Component mole % | | | | | |
| Carbon Dioxide | 0.01 | 0.05 | 40.58 | 3.72 | 70.58 |
| Nitrogen | 0.00 | 0.00 | 0.01 | 0.00 | 0.01 |
| Oxygen | 0.00 | 0.00 | 0.00 | 0.00 | 0.00 |
| Water | 99.95 | 99.92 | 59.41 | 95.55 | 29.41 |
| Monoethanolamine | 0.04 | 0.04 | 0.00 | 0.73 | 0.00 |
| Methane | 0.00 | 0.00 | 0.00 | 0.00 | 0.00 |

| Stream No. | L4'' | G4' | G4 | L4''' | L4'''' |
|---|---|---|---|---|---|
| Temp C. | 89.89 | 170.52 | 89.64 | 89.90 | 75.84 |
| Pres bar | 0.7 | 1.4 | 0.7 | 0.7 | 0.4 |
| Enth kW | −67,046.00 | −1,948.90 | −1,971.80 | −66,739.00 | −66,739.00 |
| Vapor mole frac. | 0.01 | 1.00 | 1.00 | 0.00 | 0.03 |
| Total kmol/h | 859.38 | 29.36 | 29.36 | 854.63 | 854.62 |
| Total kg/h | 15,505.53 | 537.72 | 537.72 | 15,411.69 | 15,411.69 |
| Total std L m3/h | 15.51 | 0.54 | 0.54 | 15.41 | 15.41 |
| Total std V m3/11 | 19,261.84 | 658.16 | 658.16 | 19,155.28 | 19,155.26 |
| Component mole % | | | | | |
| Carbon Dioxide | 0.05 | 1.14 | 1.14 | 0.01 | 0.01 |
| Nitrogen | 0.00 | 0.00 | 0.00 | 0.00 | 0.00 |
| Oxygen | 0.00 | 0.00 | 0.00 | 0.00 | 0.00 |
| Water | 99.92 | 98.86 | 98.86 | 99.95 | 99.95 |
| Monoethanolamine | 0.04 | 0.00 | 0.00 | 0.04 | 0.04 |
| Methane | 0.00 | 0.00 | 0.00 | 0.00 | 0.00 |

| Stream No. | L5 | a | b |
|---|---|---|---|
| Temp C. | 75.84 | 75.84 | 138.40 |
| Pres bar | 0.4 | 0.4 | 0.7 |
| Enth kW | −1,459.00 | −65,280.00 | −1,446.00 |
| Vapor mole frac. | 1.00 | 0.00 | 1.00 |
| Total kmol/h | 21.83 | 832.79 | 21.83 |
| Total kg/h | 393.88 | 15,017.81 | 393.88 |
| Total std L m3/h | 0.39 | 15.02 | 0.39 |
| Total std V m3/h | 489.40 | 18,665.86 | 489.40 |
| Component mole % | | | |
| Carbon Dioxide | 0.09 | 0.01 | 0.09 |
| Nitrogen | 0.00 | 0.00 | 0.00 |
| Oxygen | 0.00 | 0.00 | 0.00 |
| Water | 99.91 | 99.95 | 99.91 |
| Monoethanolamine | 0.00 | 0.04 | 0.00 |
| Methane | 0.00 | 0.00 | 0.00 |

The invention claimed is:

1. A method for recovering an acid gas from a liquid acid gas-rich absorbent stream comprising the steps of:
   a. providing the liquid acid gas-rich absorbent stream having absorbed acid gas therein,
   b. separating an acid gas from the liquid acid gas-rich absorbent stream in a stripping column using a gaseous stripping medium in order to provide an acid gas-containing gas stream and a liquid acid gas-lean absorbent stream,
   c. transferring heat from the acid gas-containing gas stream to a stream of heat transfer fluid in order to provide a cooled acid gas-containing stream and a heated stream,
   d. separating the heated stream into a recovered stripping medium and a liquid heat carrier, and
   e. providing the recovered stripping medium directly or indirectly to the stripping column,
      wherein the heat transfer in step c. is provided by bringing the heat transfer fluid in direct contact with the acid gas-containing gas stream to obtain the heated stream and the cooled acid gas-containing stream.

2. The method according to claim 1, wherein the acid gas is carbon dioxide.

3. The method according to claim 1 or 2, wherein the liquid heat carrier is used as at least part of the heat transfer fluid.

4. The method according to claim 1, wherein a pressure of the recovered stripping medium is higher than or equal to an operating pressure in the stripping column.

5. The method according to claim 1, wherein the absorbent is aqueous.

6. The method according to claim 1, where the recovered stripping medium, optionally compressed, is fed directly to the stripping column at a position below a feeding position of the gaseous stripping medium.

7. The method according to claim 1, wherein the recovered stripping medium prior to being provided to the stripping column is compressed to provide a compressed recovered stripping medium.

8. The method according to claim 1, wherein the separation of step d. is provided by the steps of:
   d.i. depressurizing the heated stream to provide a depressurized stream; and
   d.ii. separating the depressurized stream by flashing in a first flashing column to provide the recovered stripping medium and the heat transfer fluid.

9. The method according to claim 8, wherein the separation of step d.ii. prior to providing the heat transfer fluid provides a liquid stream which is subjected to the steps of:
   d.iii. further depressurizing the liquid stream to provide a second depressurized stream having a pressure which is lower than the pressure of the liquid stream,
   d.iv. separating the second depressurized stream in a third separating unit to provide a second gas and the liquid heat carrier;
   d.v. re-compressing the second gas to provide a re-compressed second gas; and
   d.vi. feeding the re-compressed second gas to the first flashing column where it leaves the first flashing column as part of the recovered stripping medium.

10. The method according to claim 9, wherein all the steps d.i. to d.vi. are repeated 2, 3 or 4 times.

11. The method according to claim 10, wherein the repetitions are in series and/or parallel.

12. The method according to claim 1, wherein prior to the heat transfer, the heat transfer fluid is depressurized to a pressure which is lower than the pressure of the liquid heat carrier.

13. The method according to claim 1, wherein the separation of step d. is provided by the steps of:
   d.i. separating the heated stream by flashing in a first flashing column to provide the recovered stripping medium and a liquid stream;
   d.ii. further depressurizing the liquid stream to provide a second depressurized stream having a pressure which is lower than the pressure of the liquid stream;
   d.iii. separating the second depressurized stream in a third separating unit to provide a second gas and the liquid heat carrier;
   d.iv. re-compressing the second gas to provide a re-compressed second gas; and
   d.v. feeding the re-compressed second gas to the first flashing column where it leaves the first flashing column as part of the recovered stripping medium.

14. The method according to claim 1, wherein the acid gas-containing stream is compressed to a compressed acid gas-containing stream before the heat transfer step.

15. A method according to claim 9, wherein any one or more of the heated stream, the depressurized stream, the liquid stream, or the second depressurized stream are heated by a heat source.

16. A method according to claim 2, wherein the method further comprises the steps of f. heating the liquid carbon dioxide lean absorbent stream to provide a gas/liquid heated carbon dioxide lean absorbent; and
g. separating the gas/liquid heated carbon dioxide lean absorbent in a second separator to provide an evaporated stripping medium.

17. A method according to claim 16, wherein the stripping medium is the evaporated stripping medium.

18. A method according to claim 7, wherein the stripping medium comprises the compressed stripping medium.

19. A method according to claim 17, wherein a compressed stripping medium and the evaporated stripping medium are mixed prior to being fed to the stripping column.

20. A method according to claim 1 further comprising the steps of
   optionally cooling the cooled acid gas-containing stream;
   separating the cooled acid gas-containing stream, which is optionally further cooled beforehand, into an acid gas product stream and a second liquid stream, and
   optionally recirculating the second liquid stream to the stripping column.

21. A method for recovering an acid gas from a liquid acid gas-rich absorbent comprising the steps of:
   a. providing a liquid acid gas-rich absorbent stream having absorbed acid gas therein,
   b. separating acid gas from the liquid acid gas-rich absorbent stream in a stripping column using a gaseous stripping medium in order to provide an acid gas-containing gas stream and a liquid acid gas-lean absorbent stream,
   c. transferring heat from the acid gas-containing gas stream to a stream of heat transfer fluid in order to provide a cooled acid gas-containing stream and a heated stream,
   d. separating the heated stream into a recovered stripping medium and a liquid heat carrier, and
   e. providing the recovered stripping medium directly or indirectly to the stripping column,
   wherein the liquid acid gas-lean absorbent stream is heated in a third heat exchanger and separated to provide the gaseous stripping medium and a recovered liquid absorbent stream and wherein the heat transfer fluid of step c is the recovered liquid absorbent stream and wherein the heat recovery unit for the heat transfer is an indirect heat exchanger.

22. The method of claim 21, wherein the recovered liquid absorbent stream is depressurized to provide a depressurized recovered liquid absorbent stream which is heated in the heat recovery unit to provide a heated recovered liquid absorbent stream.

23. The method of claim 22, wherein the heated recovered liquid absorbent stream is separated in a fourth separator to provide an absorbent and the recovered stripping medium.

24. The method according to claim 23, wherein the recovered stripping medium is-pressurized in a second pressure increasing unit to provide a compressed recovered stripping medium, the compressed recovered stripping medium which is being provided to the stripping column.

* * * * *